US012726760B2

(12) United States Patent
Takazawa et al.

(10) Patent No.: US 12,726,760 B2
(45) Date of Patent: Sep. 1, 2026

(54) MICROPHONE DEVICE

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Takashi Takazawa, Nisshin (JP); Tomoki Tanemura, Nisshin (JP); Shuhei Shimanoe, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 129 days.

(21) Appl. No.: 18/937,139

(22) Filed: Nov. 5, 2024

(65) Prior Publication Data

US 2025/0193582 A1 Jun. 12, 2025

(30) Foreign Application Priority Data

Dec. 6, 2023 (JP) ................................ 2023-206273

(51) Int. Cl.
*H04R 1/32* (2006.01)

(52) U.S. Cl.
CPC .................................. *H04R 1/326* (2013.01)

(58) Field of Classification Search
CPC . H04R 1/04; H04R 1/08; H04R 1/326; H04R 1/30; H04R 1/342; H04R 1/38; H04R 1/406; H04R 3/005; H04R 2499/13
USPC ........................................................... 381/92
See application file for complete search history.

(56) References Cited

U.S. PATENT DOCUMENTS

| | | | | |
|---|---|---|---|---|
| 2002/0106091 | A1* | 8/2002 | Furst ..................... | H04R 19/04 381/91 |
| 2004/0037168 | A1 | 2/2004 | Smith et al. | |
| 2007/0064960 | A1* | 3/2007 | An ......................... | H04R 3/005 381/92 |
| 2018/0233827 | A1* | 8/2018 | Agranat ................. | G10K 11/04 |
| 2022/0272443 | A1 | 8/2022 | Katagiri | |

* cited by examiner

*Primary Examiner* — Paul Kim
(74) *Attorney, Agent, or Firm* — Posz Law Group, PLC

(57) ABSTRACT

A microphone device includes a housing, a microphone, a phone microphone, an analog wire, a conversion unit, and a processor. The housing has an opening portion and a horn including a horn opening portion and a horn tube extending from the horn opening portion. The microphone converts a sound that has propagated through the opening portion into an analog signal. The horn microphone converts a sound that has propagated through the horn into an analog signal. The analog wire outputs the analog signal from the horn microphone. The conversion unit acquires the analog signal from the microphone, acquires the analog signal from the horn microphone via a wire different from the analog wire, and converts the analog signal from the microphone and the analog signal from the horn microphone into digital signals. The processor performs digital signal processing on the digital signals converted by the conversion unit.

10 Claims, 22 Drawing Sheets

MICROPHONE DEVICE

CROSS REFERENCE TO RELATED APPLICATION

The present application claims the benefit of priority from Japanese Patent Application No. 2023-206273 filed on Dec. 6, 2023. The entire disclosure of the above application is incorporated herein by reference.

TECHNICAL FIELD

The present disclosure relates to a microphone device.

BACKGROUND

Conventionally, there has been known an acoustic system that includes acoustic ports, acoustic pathways connected to the respective acoustic ports, and capsules that convert acoustic signals propagated from an acoustic source through the acoustic ports and the acoustic pathways into electrical signals.

SUMMARY

The present disclosure provides a microphone device including a housing, a microphone, a horn microphone, an analog wire, a conversion unit, and a processor. The housing has an opening portion being opened, and a horn including a horn opening portion and a horn tube. The horn opening portion is opened at a position different from the opening portion. The horn tube is connected to the horn opening portion and extends in one direction. The microphone is accommodated in the housing and is configured to convert a sound that has propagated through the opening portion into an analog signal. The horn microphone is accommodated in the housing and is configured to convert a sound that has propagated through the horn into an analog signal. The analog wire is accommodated in the housing and is configured to output the analog signal from the horn microphone. The conversion unit is configured to acquire the analog signal from the microphone, acquire the analog signal from the horn microphone via a wire different from the analog wire, and convert the analog signal from the microphone and the analog signal from the horn microphone into digital signals. The processor is configured to perform digital signal processing on the digital signals converted by the conversion unit.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
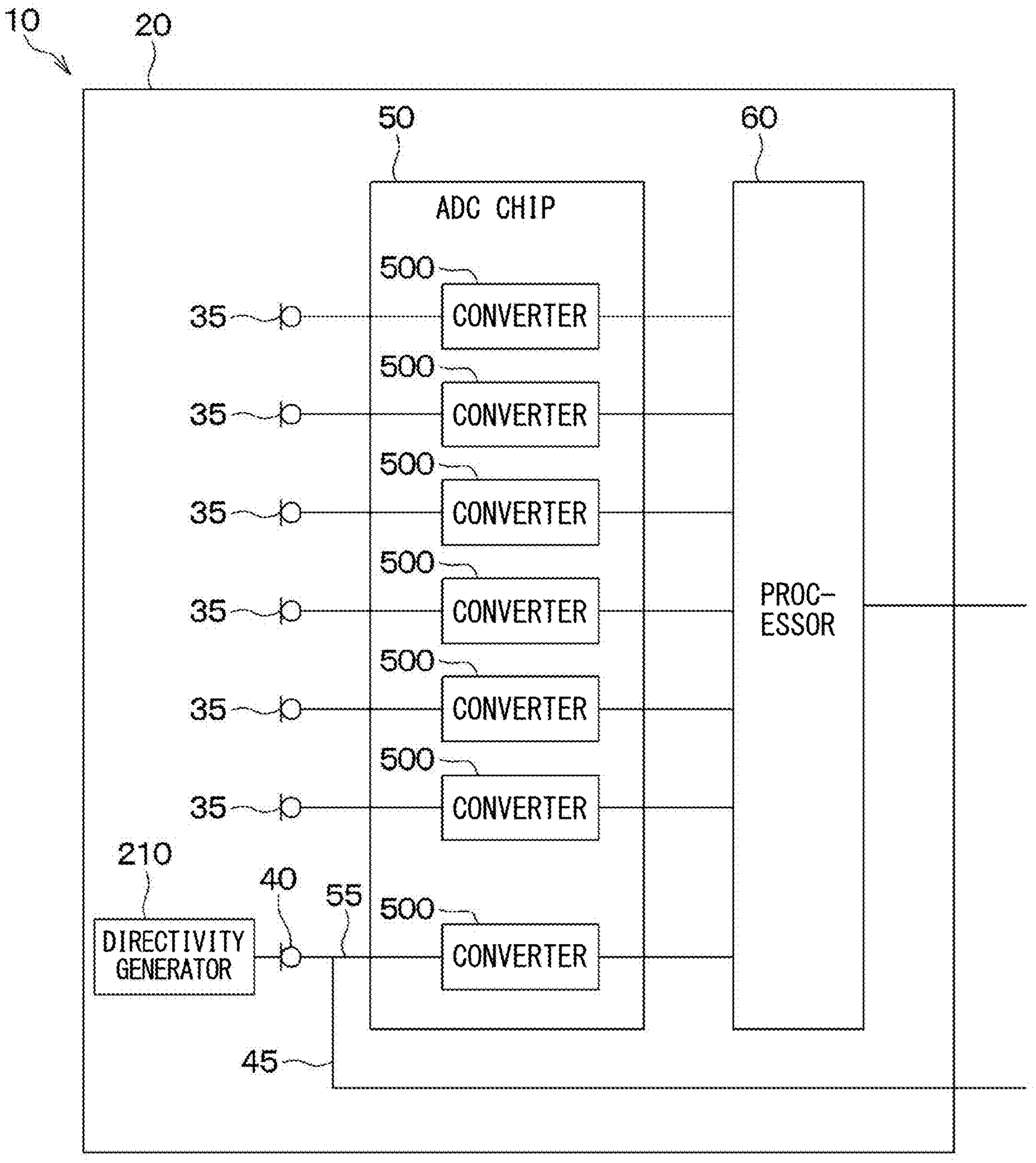
FIG. 1 is a configuration diagram of a microphone device according to a first embodiment.

In an acoustic system including acoustic ports, acoustic pathways connected to the respective acoustic ports, and capsules that convert acoustic signals propagated from an acoustic source through the acoustic ports and the acoustic pathways into electrical signals, digital signal processing such as noise reduction may be performed on the electrical signals converted by the capsules. In such a case, latency, which is a delay time in communication, may increase. When latency increases, for example, overlapping of speech timing occurs. Thus, it becomes difficult to carry out a call, and the quality of the call decreases. On the other hand, in a case where digital signal processing is not performed, the quality of the call deteriorates due to noise, making it difficult to communicate.

A microphone device according to an aspect of the present disclosure includes a housing, a microphone, a horn microphone, an analog wire, a conversion unit, and a processor. The housing has an opening portion being opened, and a horn including a horn opening portion and a horn tube. The horn opening portion is opened at a position different from the opening portion. The horn tube is connected to the horn opening portion and extends in one direction. The microphone is accommodated in the housing and is configured to convert a sound that has propagated through the opening portion into an analog signal. The horn microphone is accommodated in the housing and is configured to convert a sound that has propagated through the horn into an analog signal. The analog wire is accommodated in the housing and is configured to output the analog signal from the horn microphone. The conversion unit is configured to acquire the analog signal from the microphone, acquire the analog signal from the horn microphone via a wire different from the analog wire, and convert the analog signal from the microphone and the analog signal from the horn microphone into digital signals. The processor is configured to perform digital signal processing on the digital signals converted by the conversion unit.

The signal output from the analog wire is not digitally processed, and therefore an increase in latency is restricted. Furthermore, the processor performs the digital signal processing. Therefore, the microphone device performs the digital signal processing while restricting the increase in latency.

Hereinafter, embodiments will be described with reference to the drawings.

In the following embodiments, the same or equivalent portions are denoted by the same reference numerals, and the description thereof will be omitted.

First Embodiment

A microphone device of the present embodiment performs digital signal processing while restricting an increase in latency. This microphone device is adopted, for example, in a vehicle.

Specifically, as shown in FIGS. 1 to 11, a microphone device 10 includes a housing 20, a substrate 30, an isolator 32, microphones 35, a horn microphone 40, an analog wire 45, an analog-to-digital converter (ADC) chip 50, a digital wire 55, and a processor 60.

The housing 20 is formed from resin or the like by using injection molding, a 3D printer, or the like. As shown in FIGS. 1 to 8, the housing 20 accommodates the substrate 30, the microphones 35, the horn microphone 40, the analog wire 45, the ADC chip 50, the digital wire 55, and the processor 60, which will be described later. Furthermore, the housing 20 has opening portions 200 and a directivity generator 210.

For the purpose of describing the housing 20 and the like, a Cartesian coordinate system based on a position inside or outside the microphone device 10 is taken as an absolute coordinate system. The X-axis, the Y-axis, and the Z-axis in the absolute coordinate system are perpendicular to each other. The absolute coordinate system is represented in a right-handed coordinate system. The directions of the arrows in the drawings are the positive directions of the X-axis, the Y-axis, and the Z-axis. Furthermore, the directions opposite to the directions of the arrows in the drawings are defined as the negative directions of the X-axis, the Y-axis, and the Z-axis.

As shown in FIGS. 2 to 8, the housing 20 has a plurality of opening portions 200. In the present embodiment, the opening portions 200 face the positive direction of the Z-axis. Furthermore, spaces in the opening portions 200 extend in the Z-axis direction.

As shown in FIGS. 2 to 11, the directivity generator 210 includes a first horn 211, a second horn 212, a third horn 213, a fourth horn 214, a first acoustic tube 221, a second acoustic tube 222, a third acoustic tube 223 and a fourth acoustic tube 224. With these components, the directivity generator 210 generates directivity for a sound collected by the microphone device 10, as described later. In the present disclosure, the directivity refers to the property that the ease of collecting sound varies depending on the direction.

The first horn 211, the second horn 212, the third horn 213 and the fourth horn 214 are, for example, exponential horns. It should be noted that the first horn 211, the second horn 212, the third horn 213 and the fourth horn 214 are not limited to being exponential horns, but may be cylindrical horns, parabolic horns, conical horns, hyperbolic horns, or the like.

The first horn 211 includes a first horn opening portion 231 and a first horn tube 241, as shown in FIGS. 2-5, FIG. 9 and FIG. 10.

The first horn opening portion 231 is opened at a position different from the opening portions 200. In the present embodiment, the first horn opening portion 231 is opened toward the positive direction of the Z-axis.

The first horn tube 241 is connected to the first horn opening portion 231. The first horn tube 241 extends in one direction from the first horn opening portion 231, in the present embodiment, in the negative direction of the Z-axis. The first horn 211 is an exponential horn. Therefore, a cross-sectional area of the first horn tube 241 when cut in a direction perpendicular to the one direction increases in a direction from a side of the first horn tube 241 opposite to the first horn opening portion 231 toward the first horn opening portion 231. In the present embodiment, the cross-sectional area of first horn tube 241 in the direction perpendicular to the Z-axis, that is, when cut on the XY plane, increases in the positive direction of the Z-axis.

The second horn 212 includes a second horn opening portion 232 and a second horn tube 242 as shown in FIGS. 2-4, FIG. 6 and FIGS. 9-11.

The second horn opening portion 232 is opened at a position different from the opening portions 200 and the first horn opening portion 231. The second horn opening portion 232 is opened in the same direction as the first horn opening portion 231. In the present embodiment, the second horn opening portion 232 faces the positive direction of the Z-axis.

The second horn tube 242 is connected to the second horn opening portion 232. The second horn tube 242 extends in the one direction from the second horn opening portion 232, in the present embodiment, in the negative direction of the Z-axis. The second horn 212 is an exponential horn. Therefore, a cross-sectional area of the second horn tube 242 when cut in a direction perpendicular to the one direction increases in a direction from a side of the second horn tube 242 opposite to the second horn opening portion 232 toward the second horn opening portion 232. In the present embodiment, the cross-sectional area of second horn tube 242 when cut in a direction perpendicular to the Z-axis, that is, in the X-axis or the Y-axis direction, increases in the positive direction of the Z-axis.

The third horn 213 includes a third horn opening portion 233 and a third horn tube 243 as shown in FIG. 2, FIG. 3, FIG. 5, FIG. 7 and FIG. 9.

The third horn opening portion 233 is formed at a position different from the opening portions 200, the first horn opening portion 231 and the second horn opening portion 232. The third horn opening portion 233 is opened in the same direction as the first horn opening portion 231 and the second horn opening portion 232. In the present embodiment, the third horn opening portion 233 faces the positive direction of the Z-axis.

The third horn tube 243 is connected to the third horn opening portion 233. The third horn tube 243 extends in the one direction from the third horn opening portion 233, which is the negative direction of the Z-axis in the present embodiment. The third horn 213 is an exponential horn. Therefore, a cross-sectional area of the third horn tube 243 when cut in a direction perpendicular to the one direction increases in a direction from a side of the third horn tube 243 opposite to the third horn opening portion 233 toward the third horn opening portion 233. In the present embodiment, the cross-sectional area of third horn tube 243 when cut in a direction perpendicular to the Z-axis, that is, in the X-axis or the Y-axis direction, increases in the positive direction of the Z-axis.

The fourth horn 214 includes a fourth horn opening portion 234 and a fourth horn tube 244, as shown in FIG. 2, FIG. 3, FIG. 6, FIG. 7 and FIG. 11.

The fourth horn opening portion 234 is formed at a position different from the opening portions 200, the first horn opening portion 231, the second horn opening portion 232 and the third horn opening portion 233. Furthermore, the fourth horn opening portion 234 is opened in the same direction as the first horn opening portion 231, the second horn opening portion 232, and the third horn opening portion 233, which faces the positive direction of the Z-axis.

The fourth horn tube 244 is connected to the fourth horn opening portion 234. The fourth horn tube 244 extends in the one direction from the fourth horn opening portion 234, in the present embodiment, in the negative direction of the Z-axis. The fourth horn 214 is an exponential horn. Therefore, a cross-sectional area of the fourth horn tube 244 when cut in a direction perpendicular to the one direction increases in a direction from a side of the fourth horn tube 244 opposite to the fourth horn opening portion 234 toward the fourth horn opening portion 234. In the present embodiment, the cross-sectional area of fourth horn tube 244 when cut in a direction perpendicular to the Z-axis, that is, in the X-axis or the Y-axis direction, increases in the positive direction of the Z-axis.

As shown in FIGS. 2 to 4, FIG. 9 and FIG. 10, the first horn 211 and the second horn 212 are aligned in a direction perpendicular to the one direction, which is the Y-axis direction in the present embodiment. As shown in FIG. 2, FIG. 3, FIG. 5 and FIG. 9, the first horn 211 and the third horn 213 are aligned in a direction perpendicular to the one direction and the direction in which the first horn 211 and the second horn 212 are aligned, which is the X-axis direction in the present embodiment. As shown in FIG. 2, FIG. 3, FIG. 6, FIG. 9 and FIG. 11, the second horn 212 and the fourth horn 214 are aligned in a direction that is perpendicular to the one direction and the direction in which the first horn 211 and the second horn 212 are aligned, which is the X-axis direction in the present embodiment. Furthermore, as shown in FIG. 2, FIG. 3, FIG. 7 and FIG. 9, the third horn 213 and the fourth horn 214 are aligned in the direction in which the first horn 211 and the second horn 212 are aligned, which is the Y-axis direction in the present embodiment.

In the present embodiment, the first horn 211, the second horn 212, the third horn 213 and the fourth horn 214 are formed in the same shape and the same size. In the present disclosure, the term "same" includes a range of manufacturing error. However, the first horn 211, the second horn 212, the third horn 213 and the fourth horn 214 are not limited to being formed in the same shape and the same size, and may be formed in different shapes and different sizes.

As shown in FIG. 2, FIGS. 4 to 6, and FIGS. 8 to 11, the first acoustic tube 221 is formed in a cylindrical shape, and is connected to the first horn tube 241 and the second horn tube 242 in the Z-axis direction. The first acoustic tube 221 extends in a direction that intersects the one direction, which is the Y-axis direction in the present embodiment.

As shown in FIG. 2, FIG. 5, FIG. 6, FIG. 8, FIG. 9 and FIG. 11, the second acoustic tube 222 is formed in a cylindrical shape and is connected to the third horn tube 243 and the fourth horn tube 244 in the Z-axis direction. The second acoustic tube 222 extends parallel to the direction in which the first acoustic tube 221 extends, which is the Y-axis direction in the present embodiment. The second acoustic tube 222 is formed to have the same shape and the same size as the first acoustic tube 221. However, the second acoustic tube 222 is not limited to being formed in the same shape and the same size as the first acoustic tube 221, and may be formed in a different shape and different size from the first acoustic tube 221.

As shown in FIG. 2, FIG. 4, and FIGS. 7 to 11, the third acoustic tube 223 is formed in a cylindrical shape, and is connected to the first acoustic tube 221 and the second acoustic tube 222 in the Z-axis direction. The third acoustic tube 223 extends in a direction that intersects the one direction and the direction in which the first acoustic tube 221 extends, which is the X-axis direction in the present embodiment. Therefore, the first acoustic tube 221, the second acoustic tube 222 and the third acoustic tube 223 form an H-shaped acoustic tube.

As shown in FIG. 2 and FIGS. 8 to 11, the fourth acoustic tube 224 is formed in a cylindrical shape and is connected to a portion of the third acoustic tube 223 between the first acoustic tube 221 and the second acoustic tube 222 in the Z-axis direction. The fourth acoustic tube 224 extends from the third acoustic tube 223 in a direction that intersects the direction in which the third acoustic tube 223 extends, which is the negative direction of the Z-axis in the present embodiment. The fourth acoustic tube 224 is not limited to extending from the third acoustic tube 223 in the Z-axis direction, and may extend from the third acoustic tube 223 in the Y-axis direction, or the like.

The substrate 30 is a printed circuit board. The substrate 30 is accommodated in the housing 20 as shown in FIG. 2 and FIGS. 4 to 8. The substrate 30 is fixed to the housing 20 via, for example, a snap fit or a screw (not shown) and the isolator 32 (described later). A thickness direction of the substrate 30 coincides with the Z-axis direction. As shown in FIGS. 4 to 8, the substrate 30 has a substrate front surface 300, a substrate rear surface 302, and substrate holes 304.

The substrate front surface 300 is a surface of the substrate 30 that is perpendicular to the thickness direction of the substrate 30, and is located on the positive side of the Z-axis in the present embodiment.

The substrate rear surface 302 is a surface of the substrate 30 opposite to the substrate front surface 300, and is located on the negative side of the Z-axis in the present embodiment.

The substrate holes 304 are formed at positions corresponding to the positions of the opening portions 200. Thus, the number of substrate holes 304 corresponds to the number of opening portions 200. The substrate holes 304 communicate with the spaces of the respective opening portions 200. The substrate holes 304 extend in the Z-axis direction and penetrate the substrate front surface 300 and the substrate rear surface 302.

The isolator 32 is disposed between the housing 20 and the substrate front surface 300. The isolator 32 is made of an elastic material such as closed-cell sponge, rubber, foamed rubber, or clay, or an adhesive. The isolator 32 prevents sound entering through one of the opening portions 200 from propagating between the housing 20 and the substrate front surface 300 and propagating to the microphone 35 other than the microphone 35 that is located directly below the one of the opening portions 200. In addition, the isolator 32 prevents vibrations transmitted from the housing 20 from propagating through the substrate 30 and being observed by the microphones 35.

The microphones 35 are connected to the substrate rear surface 302 of the near the positions of the substrate holes 304. Therefore, the number of microphones 35 corresponds to the number of opening portions 200 and substrate holes 304. The microphones 35 are accommodated in the housing 20. Each of the microphones 35 converts sound propagating through the opening portion 200 and the substrate hole 304 into an analog signal. The analog signal is a signal that express a continuously changing physical quantity. In the present embodiment, the analog signal is an electric signal such as a current or a voltage corresponding to the sound. Each of the microphones 35 may also be a microphone having a sound hole that captures sound from a side opposite to a surface mounted on the substrate 30. That is, the microphones 35 may also be disposed between the substrate 30 and the housing 20 and mounted on the substrate front surface 300 such that the opening portions 200 and sound holes of the microphones 35 are positioned correspondingly.

Figure 2:
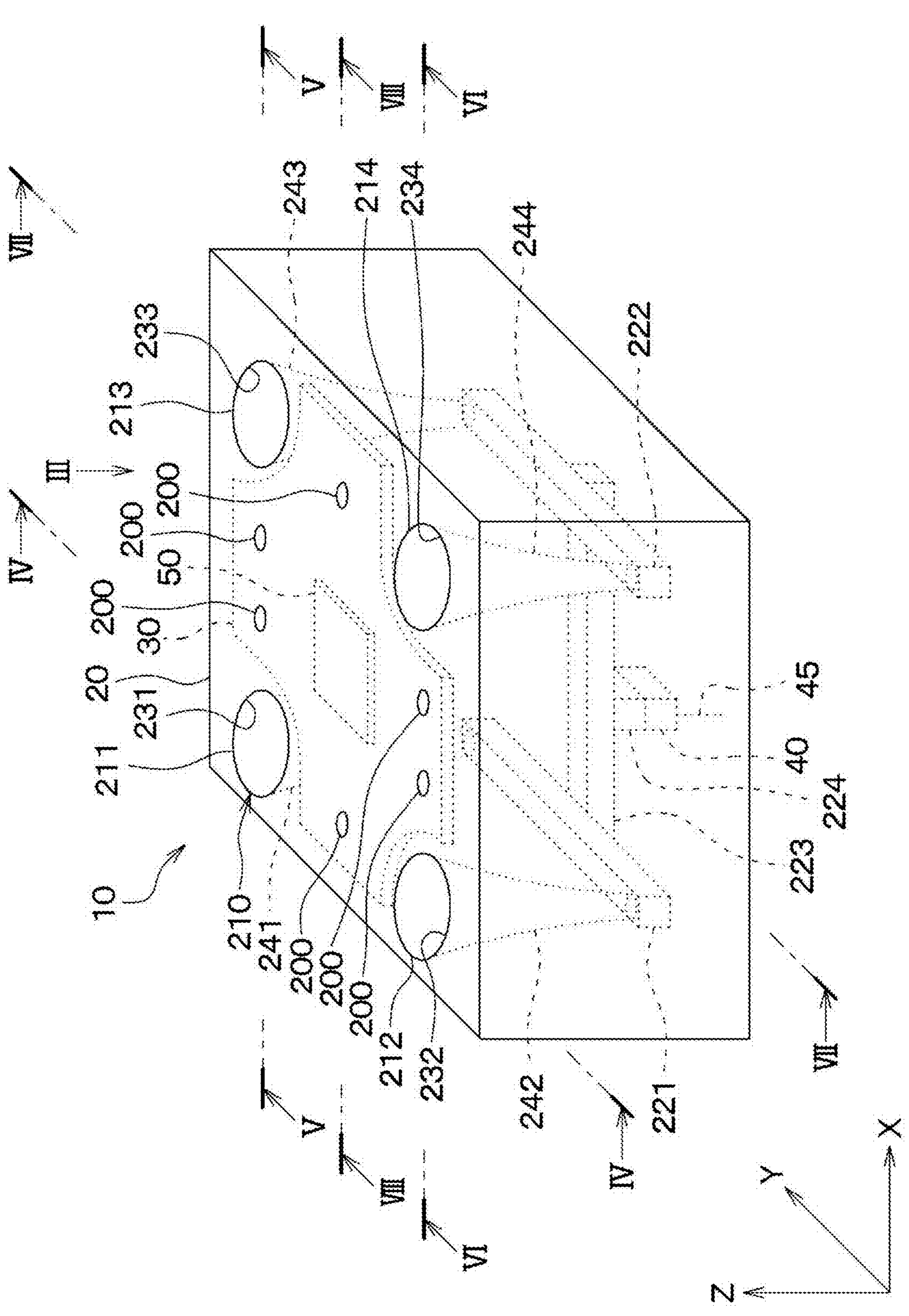
FIG. 2 is a perspective view of the microphone device.
Figure 3:
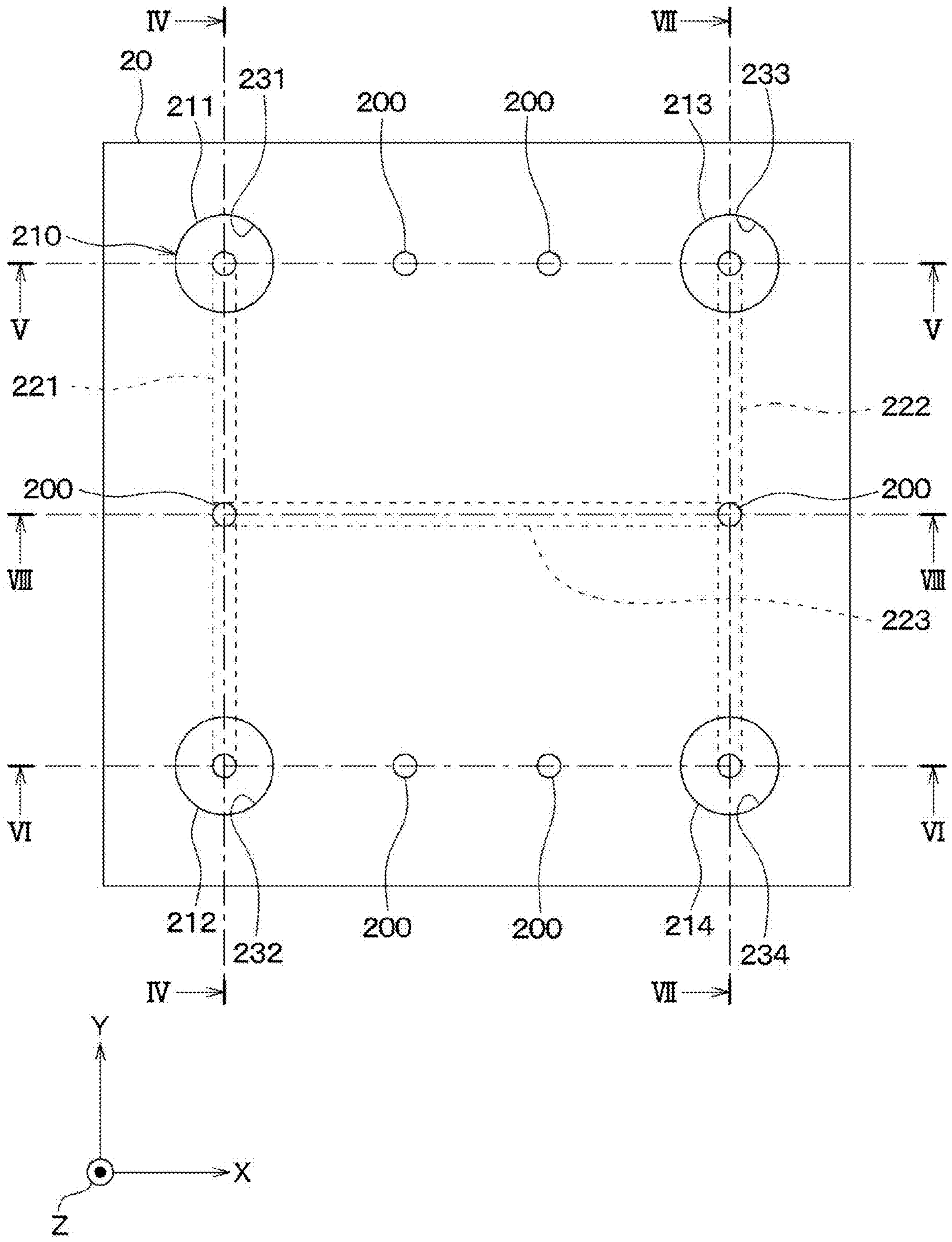
FIG. 3 is an enlarged view of the microphone device as seen from a direction indicated by an arrow III in FIG. 2.
Figure 4:
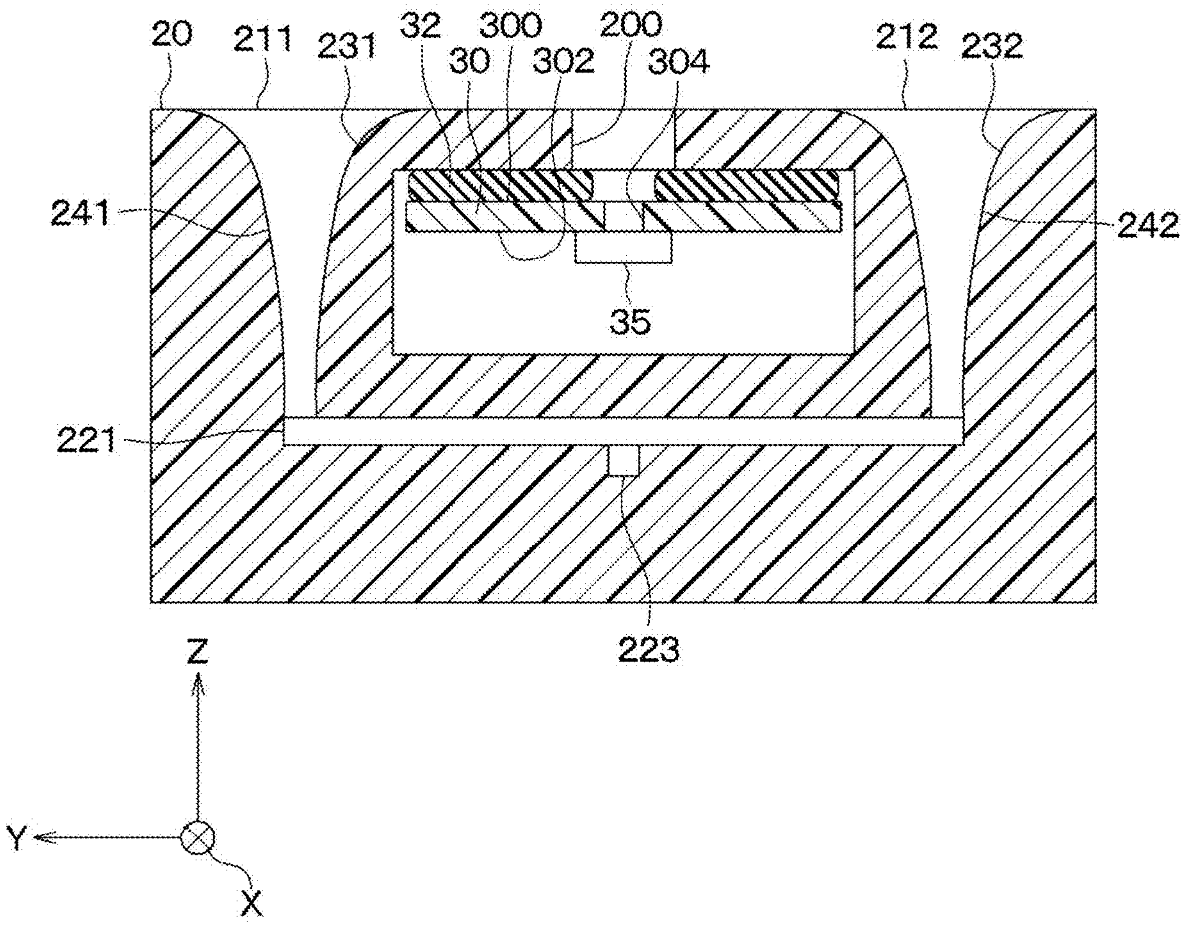
FIG. 4 is an enlarged cross-sectional view of the microphone device taken along a line IV-IV in FIG. 2.
Figure 5:
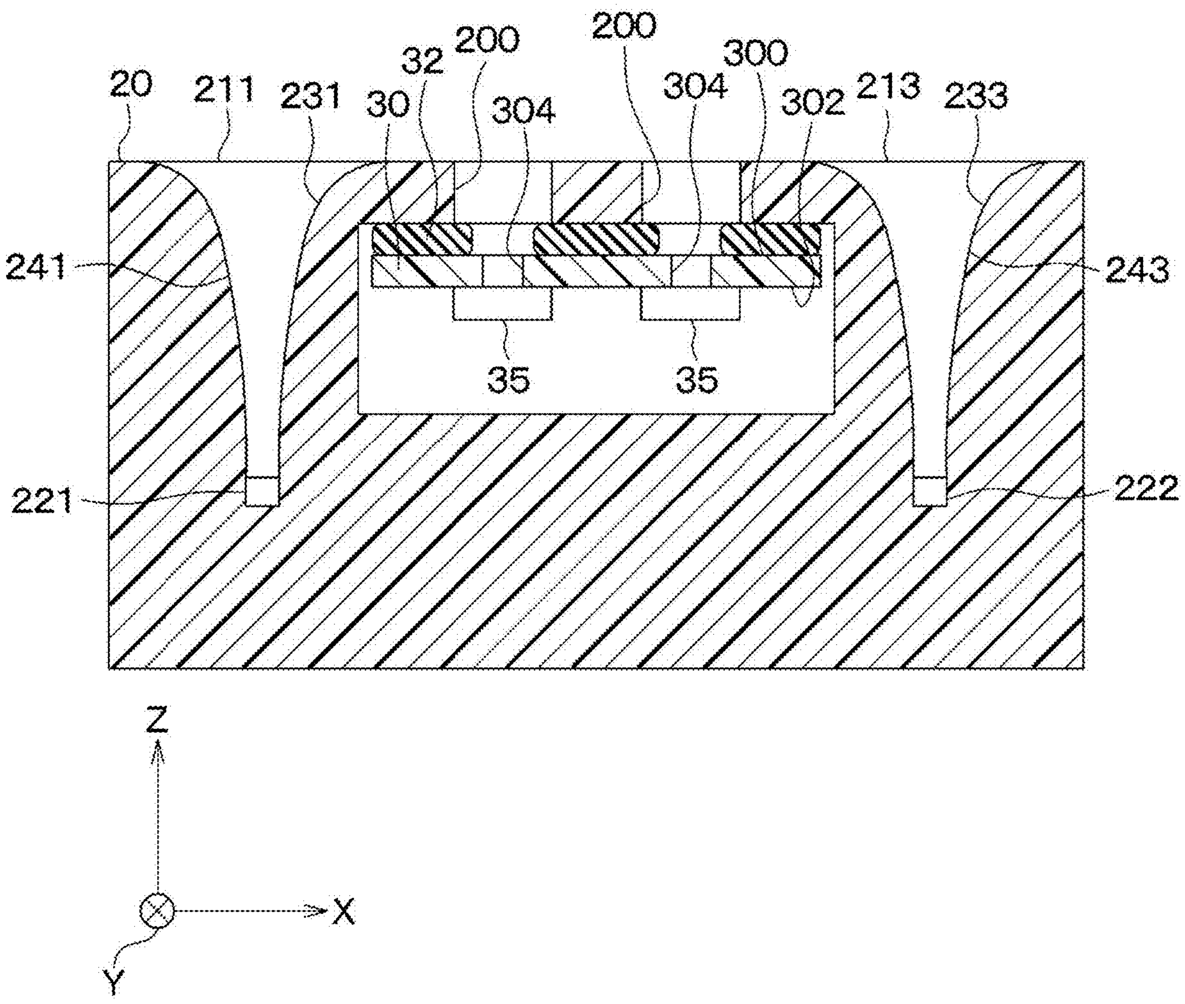
FIG. 5 is an enlarged cross-sectional view of the microphone device taken along a line V-V in FIG. 2.
Figure 6:
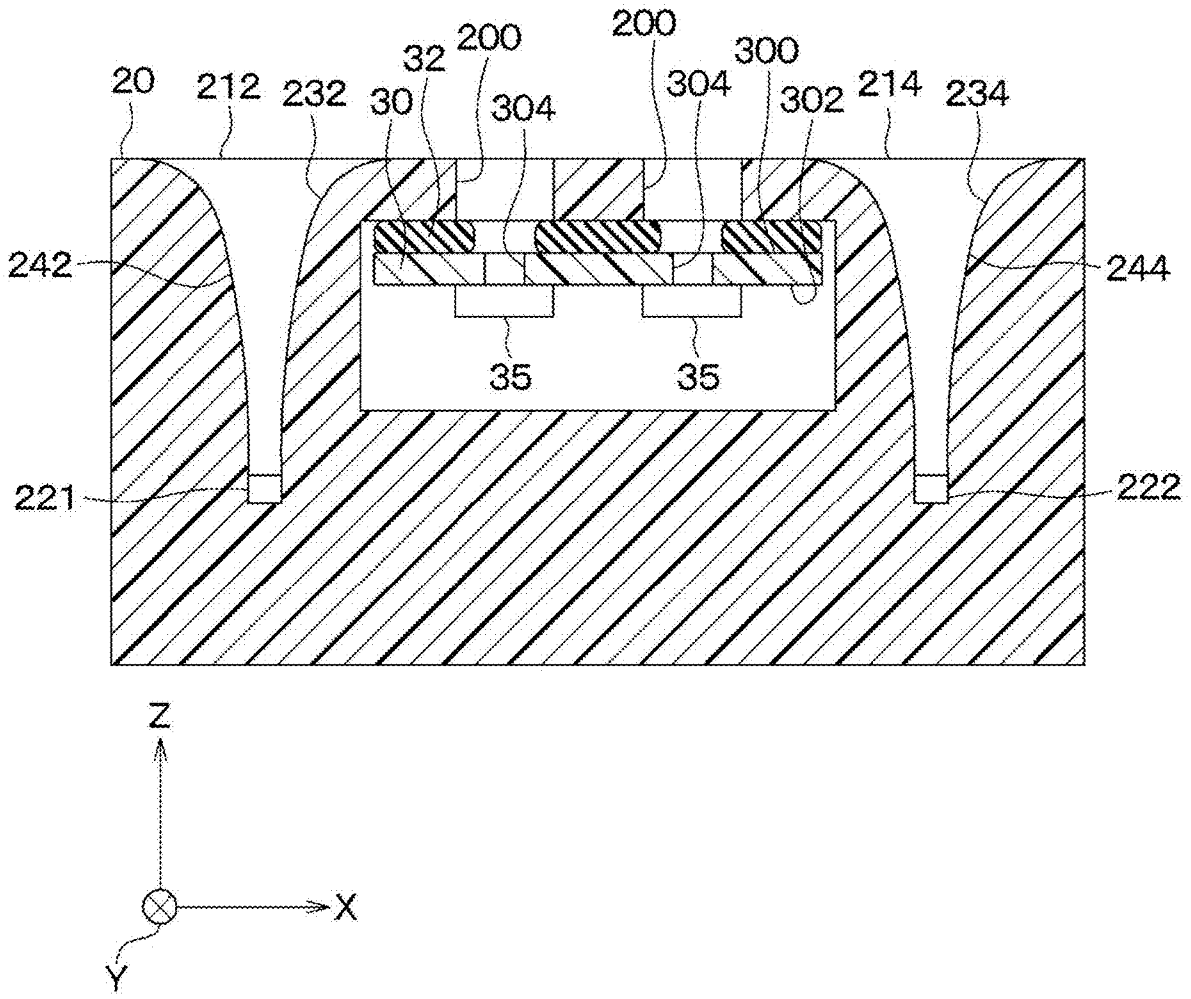
FIG. 6 is an enlarged cross-sectional view of the microphone device taken along a line VI-VI in FIG. 2.
Figure 7:
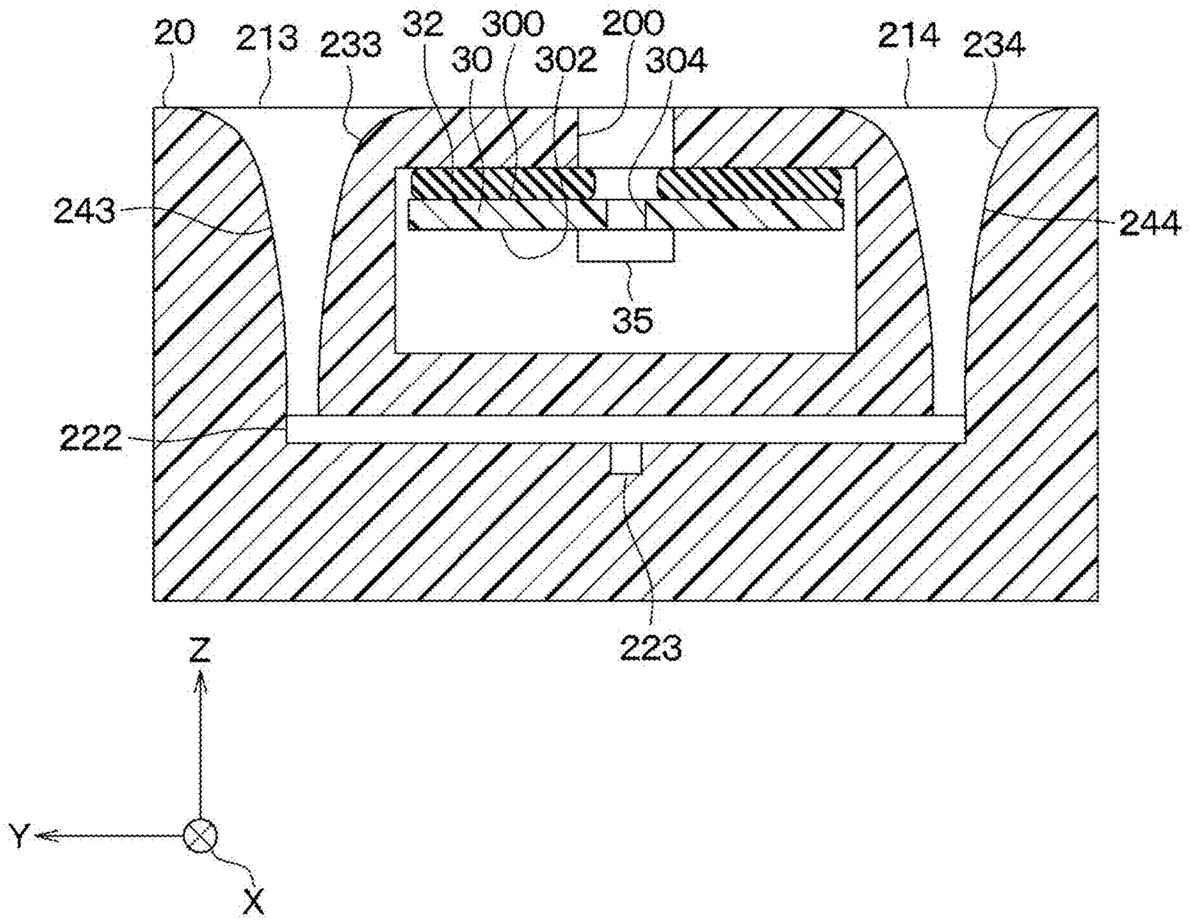
FIG. 7 is an enlarged cross-sectional view of the microphone device taken along a line VII-VII in FIG. 2.
Figure 8:
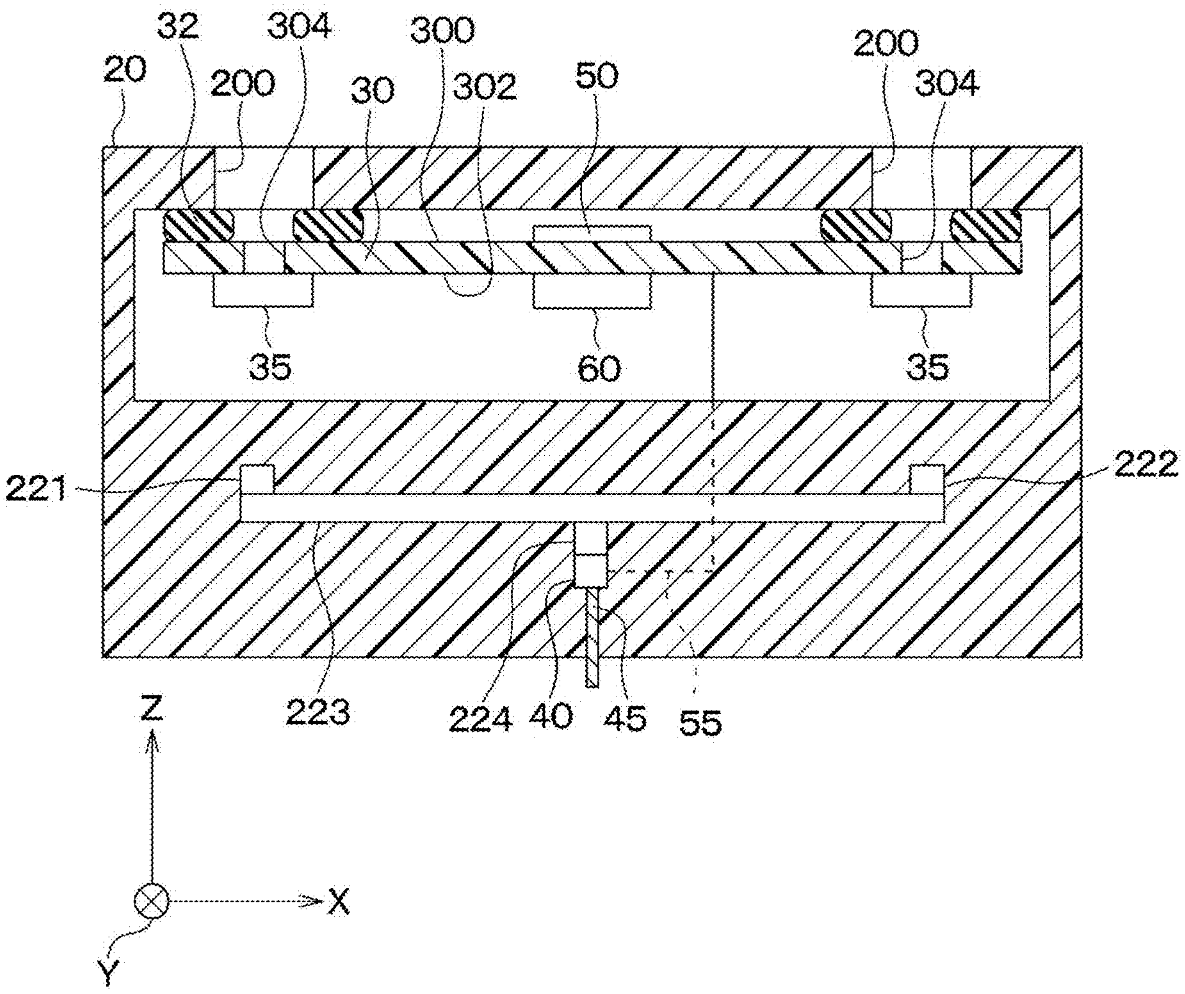
FIG. 8 is an enlarged cross-sectional view of the microphone device taken along a line VIII-VIII in FIG. 2.

The horn microphone 40 is connected to the fourth acoustic tube 224 as shown in FIG. 2 and FIG. 8. The horn microphone 40 is accommodated in the housing 20. The horn microphone 40 converts a sound propagating through the first horn 211, the first acoustic tube 221, the third acoustic tube 223, and the fourth acoustic tube 224 into an analog signal. The horn microphone 40 also converts a sound propagating through the second horn 212, the first acoustic tube 221, the third acoustic tube 223, and the fourth acoustic tube 224 into an analog signal. The horn microphone 40 also converts a sound propagating through the third horn 213, the second acoustic tube 222, the third acoustic tube 223 and the fourth acoustic tube 224 into an analog signal. Furthermore, the horn microphone 40 also converts a sound propagating through the fourth horn 214, the second acoustic tube 222, the third acoustic tube 223 and the fourth acoustic tube 224 into an analog signal.

The analog wire 45 is connected to the horn microphone 40. The analog wire 45 is accommodated in the housing 20. The analog wire 45 outputs the analog signals from the horn microphone 40 to the outside of the microphone device 10.

The ADC chip 50 corresponds to a conversion unit, and is mounted on the substrate front surface 300. Thus, the ADC chip 50 is accommodated in the housing 20. The ADC chip 50 is connected to the microphones 35 through wires, vias, or the like (not shown) of the substrate 30. Therefore, the ADC chip 50 acquires the analog signals from the microphones 35 through the wires, the vias, or the like (not shown) of the substrate 30. The ADC chip 50 is also connected to the horn microphone 40 via a wire, a via, or the like (not shown) of the substrate 30 and the digital wire 55. Therefore, the ADC chip 50 acquires the analog signals from the horn microphone 40 via the wire, the via, or the like (not shown) of the substrate 30 and the digital wire 55.

As shown in FIG. 1, the ADC chip 50 includes converters 500 corresponding to the microphones 35 and the horn microphone 40, respectively. Each of the converters 500 is a circuit that converts an analog signal into a digital signal. Through respective converters 500, the ADC chip 50 converts the analog signals from the microphones 35 and the horn microphone 40 into digital signals. It should be noted that ADC is an abbreviation for Analog to Digital Converter. A digital signal is a signal that is discretized with respect to variables such as time and measurements such as current and voltage. Discretization refers to converting an analog signal into discrete values.

The processor 60 is mainly composed of a microcomputer and includes a central processing unit (CPU), a read only memory (ROM), a flash memory, a random access memory (RAM), an input/output (I/O), and a bus line connecting these components. As shown in FIG. 8, the processor 60 is mounted on, for example, the substrate rear surface 302. Furthermore, the processor 60 is connected to the ADC chip 50 via a wire, a vias, or the like (not shown) of the substrate 30.

The processor 60 performs digital signal processing on the digital signals converted by the ADC chip 50. For example, the processor 60 performs sound source separation such as BSS on the digital signal converted by the ADC chip 50 using ICA, PCA, or the like. As a result, the processor 60 makes noise contained in the digital signals converted by the ADC chip 50 smaller than noise contained in the analog signals from the horn microphone 40. The processor 60 outputs signals after the digital signal processing to the outside of the microphone device 10 via a wire or the like (not shown). Note that ICA is an abbreviation for Independent Component Analysis. PCA is an abbreviation for Principal Component Analysis. BSS is an abbreviation for Blind Source Separation. In the present disclosure, noise refers to unnecessary or undesirable sound information.

The microphone device 10 is configured as described above. Next, generation of directivity by the directivity generator 210 will be described.

Figure 9:
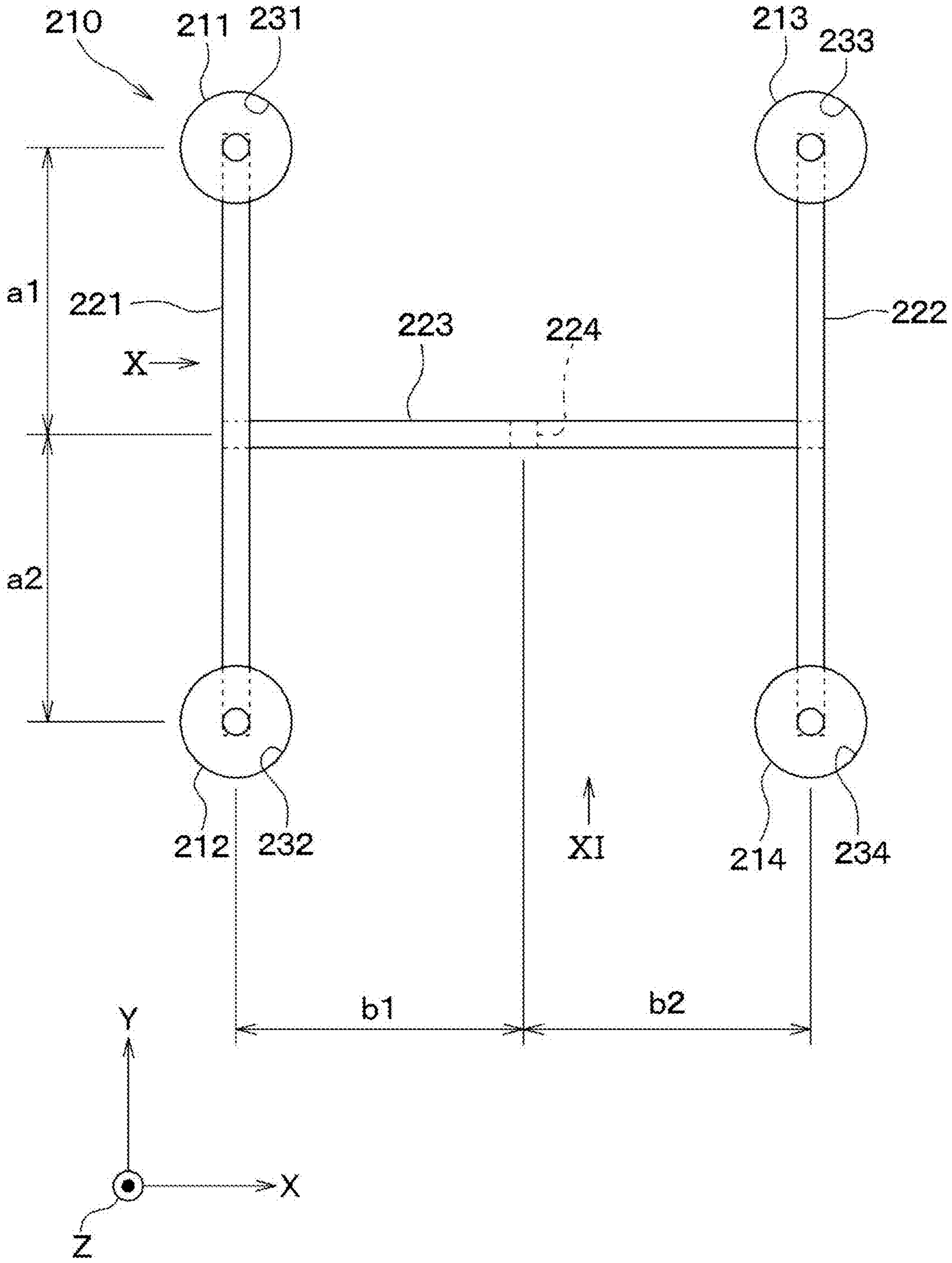
FIG. 9 is a top view of a directivity generator in the microphone device.
Figure 10:
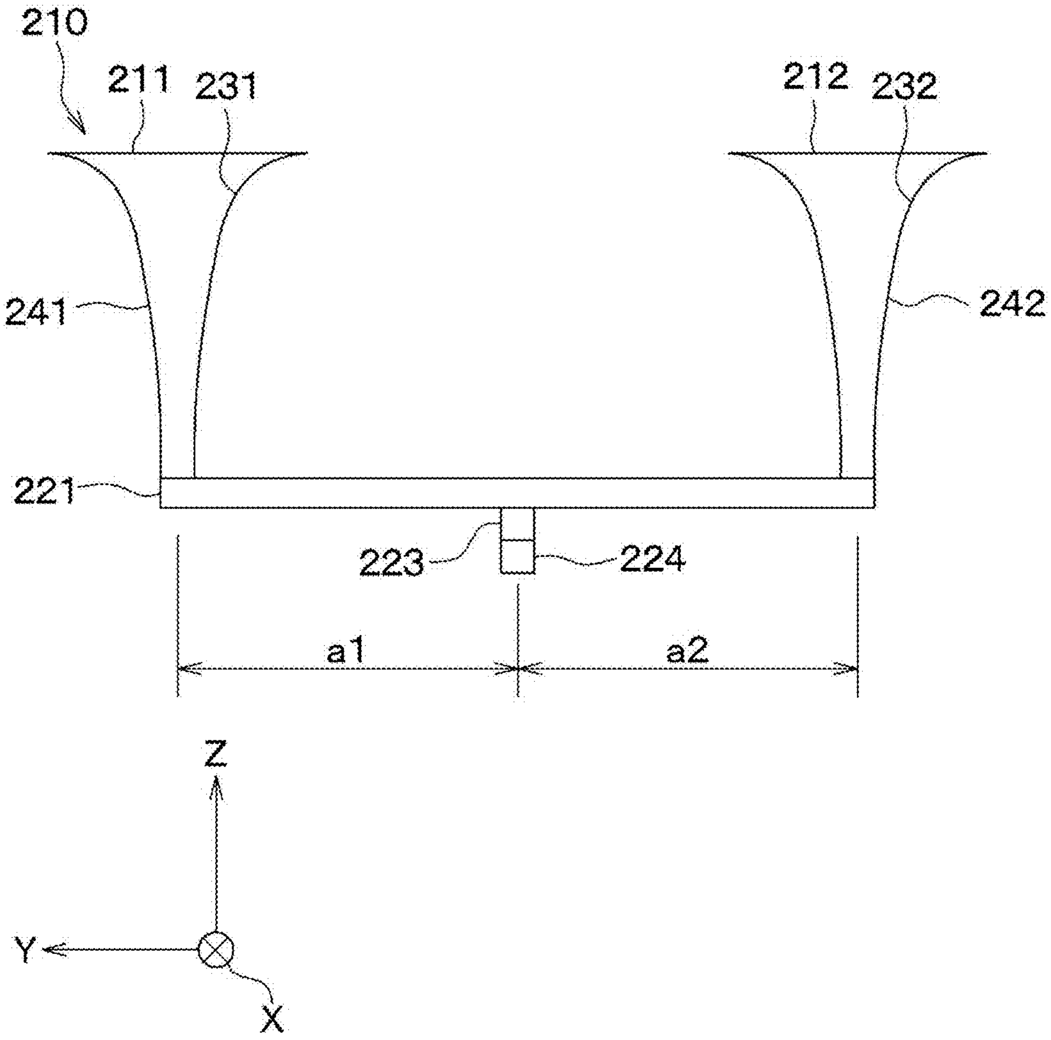
FIG. 10 is a view of the directivity generator as seen from a direction indicated by an arrow X in FIG. 9.
Figure 11:
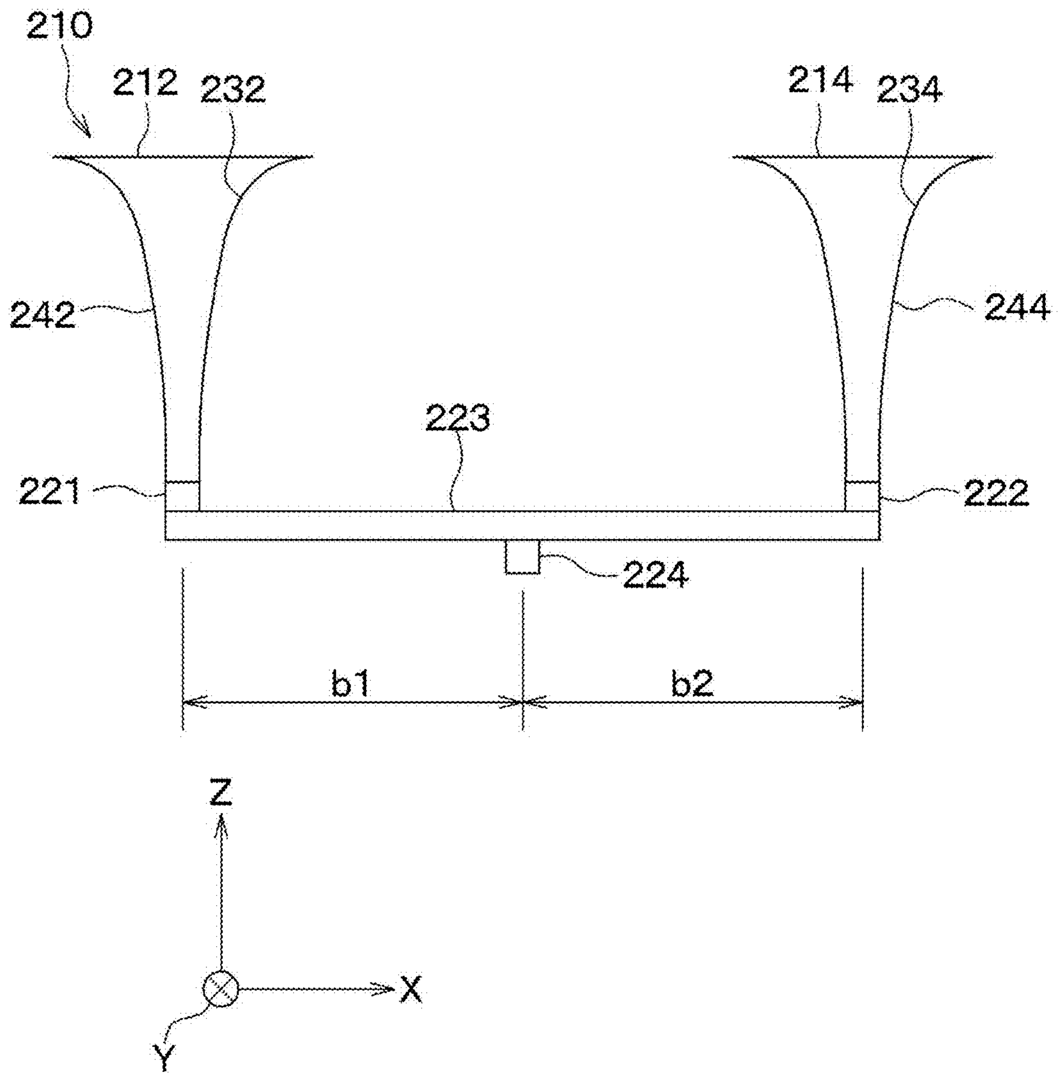
FIG. 11 is a view of the directivity generator as seen from a direction indicated by an arrow XI in FIG. 9.

As shown in FIGS. 9 to 11, a distance in the Y-axis direction from a center of a connection portion between the first horn 211 and the first acoustic tube 221 to a center of a connection portion between the first acoustic tube 221 and the third acoustic tube 223 is defined as a1. A distance in the Y-axis direction from a center of a connection portion between the second horn 212 and the first acoustic tube 221 to the center of the connection portion between the first acoustic tube 221 and the third acoustic tube 223 is defined as a2. A distance in the X-axis direction from the center of the connection portion between the first acoustic tube 221 and the third acoustic tube 223 to a center of a connection portion between the third acoustic tube 223 and the fourth acoustic tube 224 is defined as b1. A distance in the X-axis direction from the center of a connection portion between the second acoustic tube 222 and the third acoustic tube 223 to the center of the connection portion between the third acoustic tube 223 and the fourth acoustic tube 224 is defined as b2.

A distance in the Y-axis direction from a center of a connection portion between the third horn 213 and the second acoustic tube 222 to the center of the connection portion between the second acoustic tube 222 and the third acoustic tube 223 is set to a1. Furthermore, a distance in the Y-axis direction from a center of a connection portion between the fourth horn 214 and the second acoustic tube 222 to the center of the connection portion between the second acoustic tube 222 and the third acoustic tube 223 is set to a2.

Figure 12:
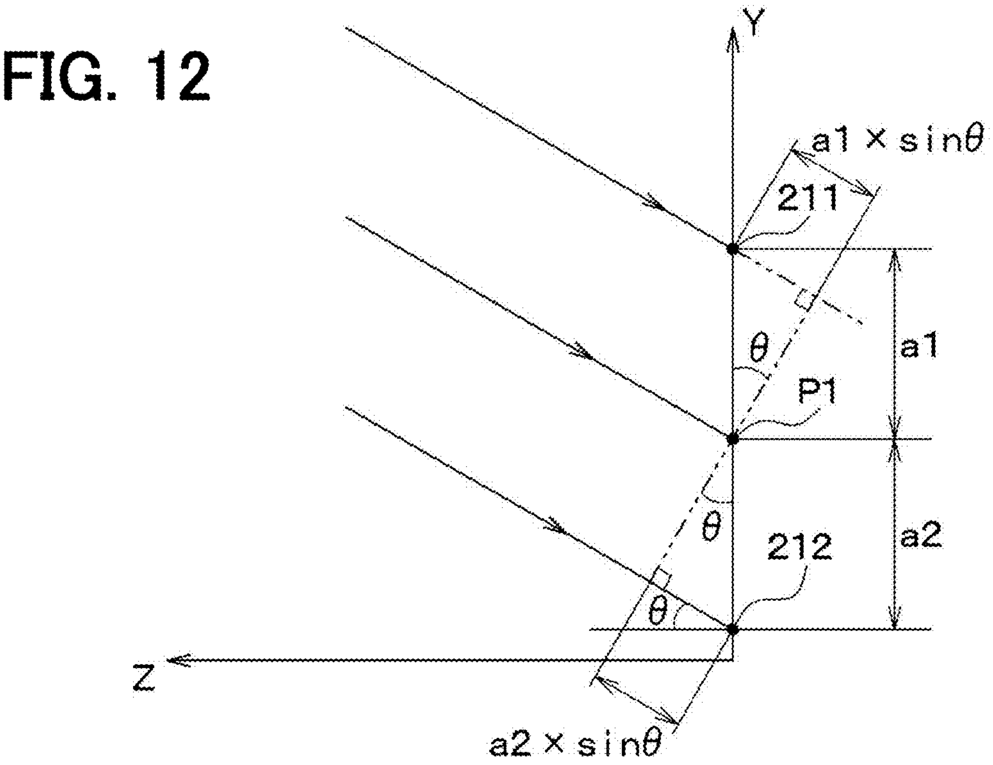
FIG. 12 is a schematic diagram showing a state where a plane sound wave enters the directivity generator at a first angle.

It is assumed that, as shown in FIG. 12, plane sound waves reach the first horn 211 and the second horn 212 from a direction that forms a first angle θ with the Z-axis in the YZ plane. The first angle θ is set to −90°≤θ≤90°. The speed of sound is defined as c. A position of a projected center when the center of the connection portion between the first acoustic tube 221 and the third acoustic tube 223 is projected onto a plane passing through the first horn opening portion 231 and the second horn opening portion 232 and perpendicular to the Z-axis is defined as a first projection position P1.

At this time, the sound wave reaches the first horn 211 earlier than the sound wave that reaches the first projection position P1 with a time delay of (−a1/c)×sin θ.

Furthermore, the sound wave reaches the second horn 212 later than the sound wave that reaches the first projection position P1 with a time delay of (a2/c)×sin θ.

The sound wave that has reached the first horn 211 propagates through the first horn 211 and reaches the center of the connection portion between the first horn 211 and the first acoustic tube 221. The sound wave that has reached the second horn 212 propagates through the second horn 212 and reaches the center of the connection portion between the second horn 212 and the first acoustic tube 221. Since the first horn 211 and the second horn 212 have the same shape and the same size, the lengths of the first horn 211 and the second horn 212 in the Z-axis direction are the same. Therefore, no time delay occurs between the sound waves propagating through the first horn 211 and the second horn 212 due to the lengths of the first horn 211 and the second horn 212 in the Z-axis direction.

The sound wave that has reached the center of the connection portion between the first horn 211 and the first acoustic tube 221 propagates through the first acoustic tube 221 and reaches the center of the connection portion between the first acoustic tube 221 and the third acoustic tube 223. The time it takes for the sound wave to travel from the center of the connection portion between the first horn 211 and the first acoustic tube 221 to the center of the connection portion between the first acoustic tube 221 and the third acoustic tube 223 is a1/c.

The sound wave that has reached the center of the connection portion between the second horn 212 and the first acoustic tube 221 propagates through the first acoustic tube 221 and reaches the center of the connection portion between the first acoustic tube 221 and the third acoustic tube 223. The time it takes for the sound wave to travel from the center of the connection portion between the second horn 212 and the first acoustic tube 221 to the center of the connection portion between the first acoustic tube 221 and the third acoustic tube 223 is a2/c.

The sound waves that have reached the center of the connection portion between the first acoustic tube 221 and the third acoustic tube 223 propagate through the third acoustic tube 223 and the fourth acoustic tube 224 and reach the horn microphone 40. Since the pathways of the sound waves are common, there is no time delay in the sound waves that reach the horn microphone 40 from the center of the connection portion between the first acoustic tube 221 and the third acoustic tube 223.

Therefore, the time delay of the sound wave that propagates through the first horn 211, the first acoustic tube 221, the third acoustic tube 223 and the fourth acoustic tube 224 and reaches the horn microphone 40 is (−a1/c)×sin θ+(a1/c). Furthermore, the time delay of the sound wave that propagates through the center of the connection portion of the first acoustic tube 221 and the third acoustic tube 223 via the second horn 212 and the first acoustic tube 221 is (a2/c)×sin θ+(a2/c).

When these time delays become the same, the sound waves reinforce each other in the entire frequency range. In this case, the first angle θ is expressed using a1 and a2 as in the following relational expression (1). Therefore, the directivity on the YZ plane is generated by a1 and a2.

$$(-a1/c)\times\sin\theta+(a1/c)=(a2/c)\times\sin\theta+(a2/c) \tag{1}$$

$$\sin\theta=(a1-a2)/(a1+a2)$$

$$\theta=\arcsin\{(a1-a2)/(a1+a2)\}$$

In the above calculation, the lengths of the first horn 211 and the second horn 212 in the Z-axis direction are not limited to being the same. The lengths of the first horn 211 and the second horn 212 in the Z-axis direction may be different, and a time delay due to the lengths of the first horn 211 and the second horn 212 in the Z-axis direction may be taken into consideration.

Also in the case of the third horn 213 and the fourth horn 214, similarly to the case of the first horn 211 and the second horn 212, the directivity on the YZ plane is generated by a1 and a2. Even in this case, the lengths of the third horn 213 and the fourth horn 214 in the Z-axis direction are not limited to being the same. The lengths of the third horn 213 and the fourth horn 214 in the Z-axis direction may be different, and a time delay due to the lengths of the third horn 213 and the fourth horn 214 in the Z-axis direction may be taken into consideration.

Figure 13:
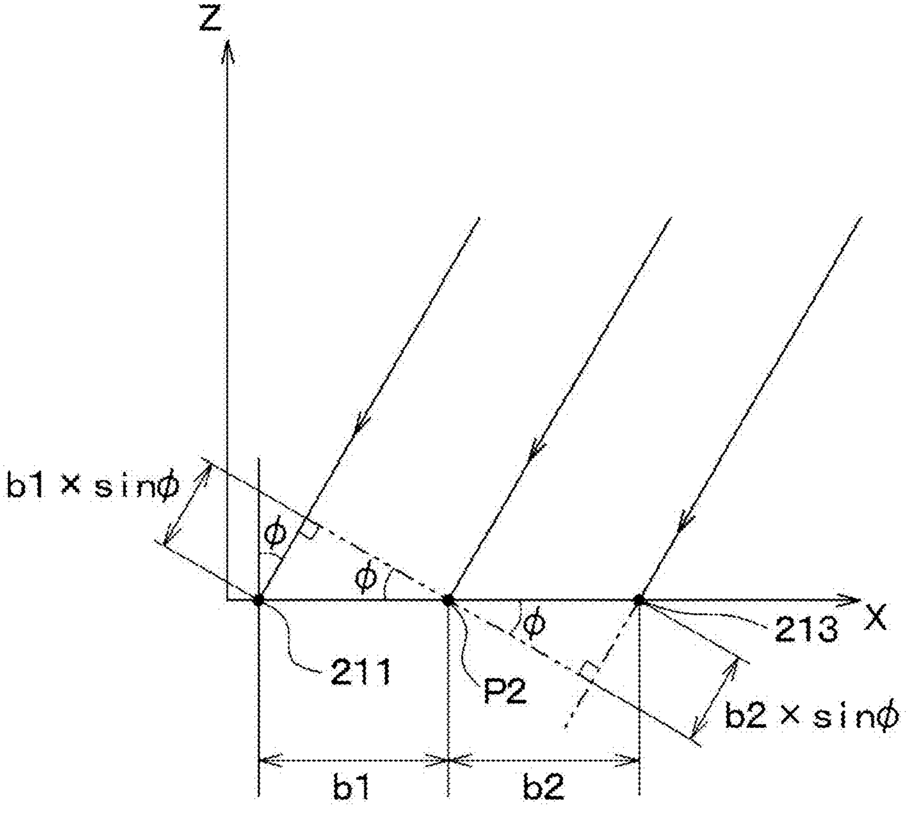
FIG. 13 is a schematic diagram showing a state where a plane sound wave enters the directivity generator at a second angle.

It is also assumed that, as shown in FIG. 13, plane sound waves reach the first horn 211 and the third horn 213 from a direction that forms a second angle φ with the Z-axis in the XZ plane. The second angle φ is set to −90°≤θ≤90°. The speed of sound is defined as c. A position of a projected center when the center of the connection portion between the third acoustic tube 223 and the fourth acoustic tube 224 is projected onto a plane passing through the first horn opening portion 231 and the third horn opening portion 233 and perpendicular to the Z-axis is defined as a second projection position P2.

At this time, the sound wave reaches the first horn 211 later than the sound wave that reaches the second projection position P2 with a time delay of (b1/c)×sin θ.

Furthermore, the sound wave reaches the third horn 213 earlier than the sound wave that reaches the second projection position P2 with a time delay of (−b2/c)×sin φ.

The sound wave that has reached the first horn 211 propagates through the first horn 211 and reaches the center of the connection portion between the first horn 211 and the first acoustic tube 221. The sound waves that has reached the third horn 213 propagates through the third horn 213 and reaches the center of the connection portion between the third horn 213 and the second acoustic tube 222. Since the first horn 211 and the third horn 213 have the same shape and the same size, the lengths of the first horn 211 and the third horn 213 in the Z-axis direction are the same. Therefore, no time delay occurs between the sound waves propagating through the first horn 211 and the third horn 213 due to the lengths of the first horn 211 and the third horn 213 in the Z-axis direction.

The sound wave that has reached the center of the connection portion between the first horn 211 and the first acoustic tube 221 propagates through the center of the connection portion between the first acoustic tube 221 and the third acoustic tube 223 via the first acoustic tube 221. The sound waves that has reached the center of the connection portion between the third horn 213 and the second acoustic tube 222 propagates through the center of the connection portion between the second acoustic tube 222 and the third acoustic tube 223 via the second acoustic tube 222. The distance in the Y-axis direction from the center of the connection portion between the first horn 211 and the first acoustic tube 221 to the center of the connection portion between the first acoustic tube 221 and the third acoustic tube 223 is set to a1. The distance in the Y-axis direction from the center of the connection portion between the third horn 213 and the second acoustic tube 222 to the center of the connection portion between the second acoustic tube 222 and the third acoustic tube 223 is set to a1. Therefore, the distances of the two pathways are the same. Therefore, no time delay occurs between the sound waves propagating through them.

The sound wave that has reached the center of the connection portion between the first acoustic tube 221 and the third acoustic tube 223 propagates through the third acoustic tube 223 and reaches the center of the connection portion between the third acoustic tube 223 and the fourth acoustic tube 224. The time it takes for the sound wave to travel from the center of the connection portion between the first acoustic tube 221 and the third acoustic tube 223 to the center of the connection portion between the third acoustic tube 223 and the fourth acoustic tube 224 is b1/c.

The sound waves that has reached the center of the connection portion between the second acoustic tube 222 and the third acoustic tube 223 propagates through the third acoustic tube 223 and reaches the center of the connection portion between the third acoustic tube 223 and the fourth acoustic tube 224. The time it takes for the sound wave to travel from the center of the connection portion between the second acoustic tube 222 and the third acoustic tube 223 to the center of the connection portion between the third acoustic tube 223 and the fourth acoustic tube 224 is b2/c.

The sound waves that have reached the center of the connection portion between the third acoustic tube 223 and the fourth acoustic tube 224 propagate through the fourth acoustic tube 224 and reach the horn microphone 40. Since the pathways of the sound waves are common, there is no time delay in the sound waves that reach the horn microphone 40 from the center of the connection portion between the third acoustic tube 223 and the fourth acoustic tube 224.

Therefore, the time delay of the sound wave that propagates through the first horn 211, the first acoustic tube 221, the third acoustic tube 223 and the fourth acoustic tube 224 and reaches the horn microphone 40 is $(b1/c)\times\sin\varphi+(b1/c)$. Furthermore, the time delay of the sound wave that propagates through the third horn 213, the second acoustic tube 222, the third acoustic tube 223 and the fourth acoustic tube 224 and reaches the horn microphone 40 is $(-b2/c)\times\sin\varphi+(b2/c)$.

When these time delays become the same, the sound waves reinforce each other in the entire frequency range. In this case, the second angle φ is expressed using b1 and b2 as in the following relational expression (2). Therefore, the directivity on the XZ plane is generated by b1 and b2.

$$(b1/c)\times\sin\varphi+(b1/c)=(-b2/c)\times\sin\varphi+(b2/c) \tag{2}$$

$$\sin\varphi=(-b1+b2)/(b1+b2)$$

$$\varphi=\arcsin\{(-b1+b2)/(b2+b2)\}$$

In the above calculation, the lengths of the first horn 211 and the third horn 213 in the Z-axis direction are not limited to being the same. The lengths of the first horn 211 and the third horn 213 in the Z-axis direction may be different, and a time delay due to the lengths of the first horn 211 and the third horn 213 in the Z-axis direction may be taken into consideration.

Also in the case of the second horn 212 and the fourth horn 214, similarly to the case of the first horn 211 and the third horn 213, the directivity on the XZ plane is generated by b1 and b2. Even in this case, the lengths of the second horn 212 and the fourth horn 214 in the Z-axis direction are not limited to being the same. The lengths of the second horn 212 and the fourth horn 214 in the Z-axis direction may be different, and a time delay due to the lengths of the second horn 212 and the fourth horn 214 in the Z-axis direction may be taken into consideration.

Figure 14A:
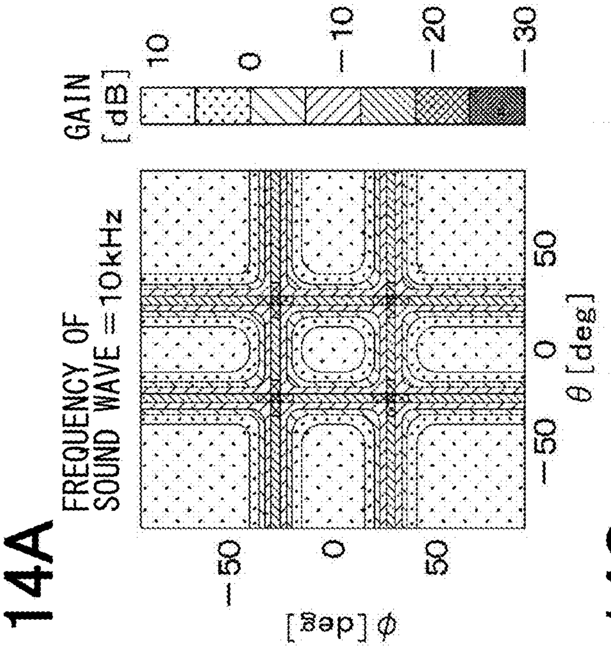
FIG. 14A is a distribution diagram showing a relationship between the first angle, the second angle, and a gain of a sound wave collected by a horn microphone in the microphone device when the sound wave has a frequency of 10 KHz.
Figure 14B:
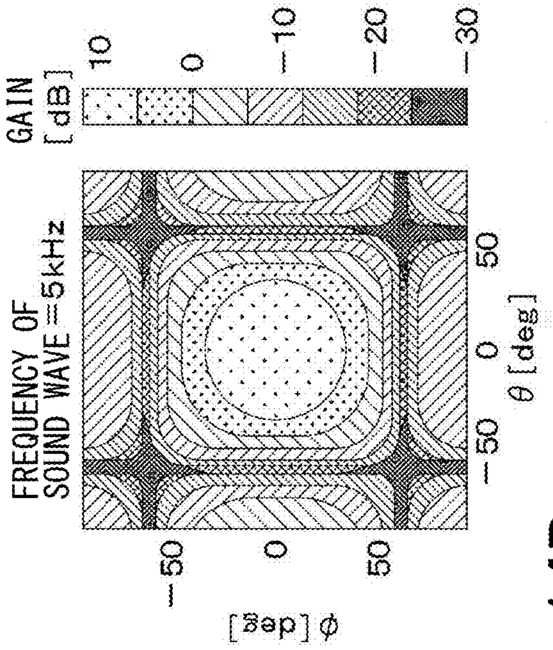
FIG. 14B is a distribution diagram showing a relationship between the first angle, the second angle, and the gain of the sound wave collected by the horn microphone in the microphone device when the sound wave has a frequency of 5 kHz.
Figure 14C:
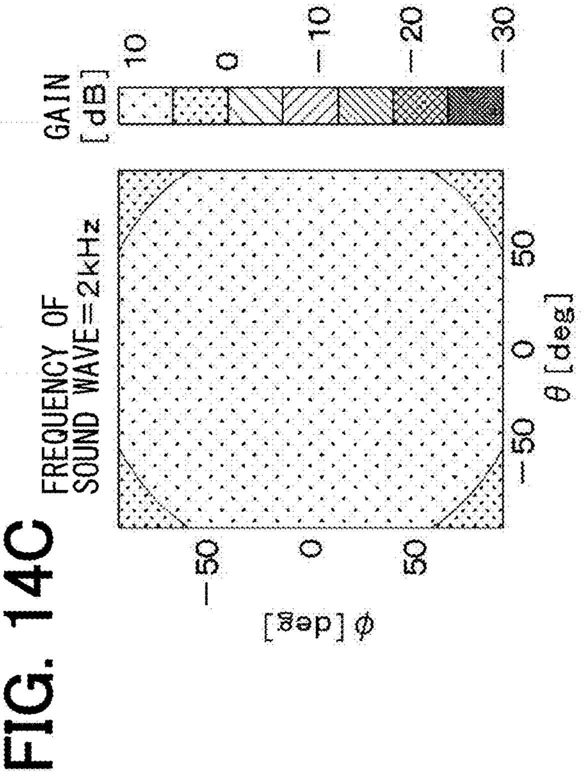
FIG. 14C is a distribution diagram showing the relationship between the first angle, the second angle, and the gain of the sound wave collected by the horn microphone in the microphone device when the sound wave has a frequency of 2 kHz.
Figure 14D:
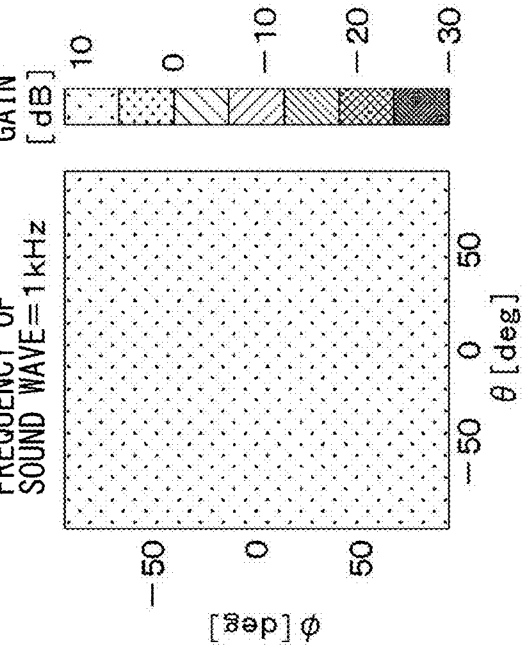
FIG. 14D is a distribution diagram showing the relationship between the first angle, the second angle, and the gain of the sound wave collected by the horn microphone of the microphone device when the sound wave has a frequency of 1 kHz.
Figure 15:
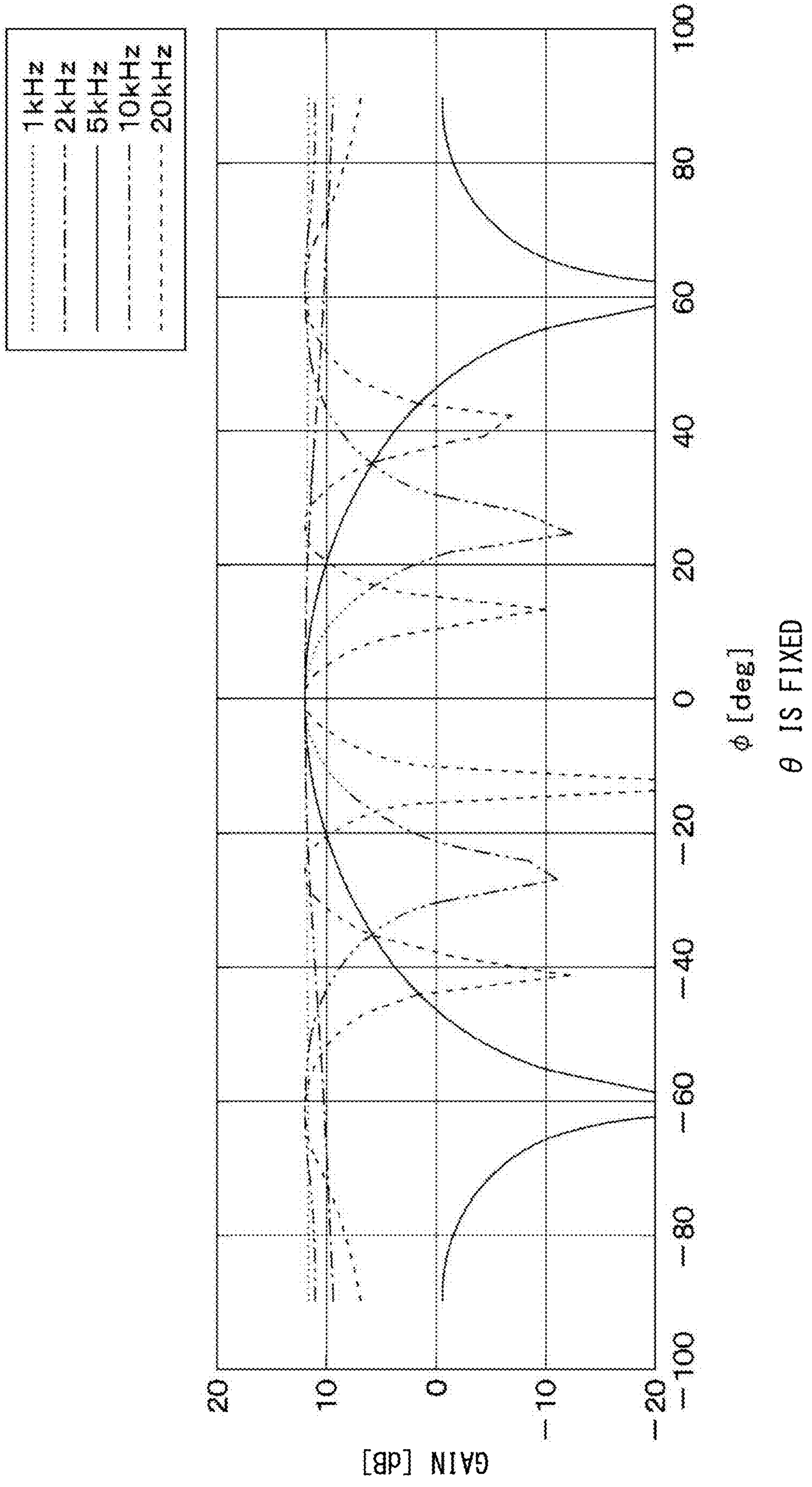
FIG. 15 is a diagram showing the relationship between the second angle and the gain of the sound wave collected by the horn microphone at each frequency of the sound wave when the first angle is fixed.
Figure 16:
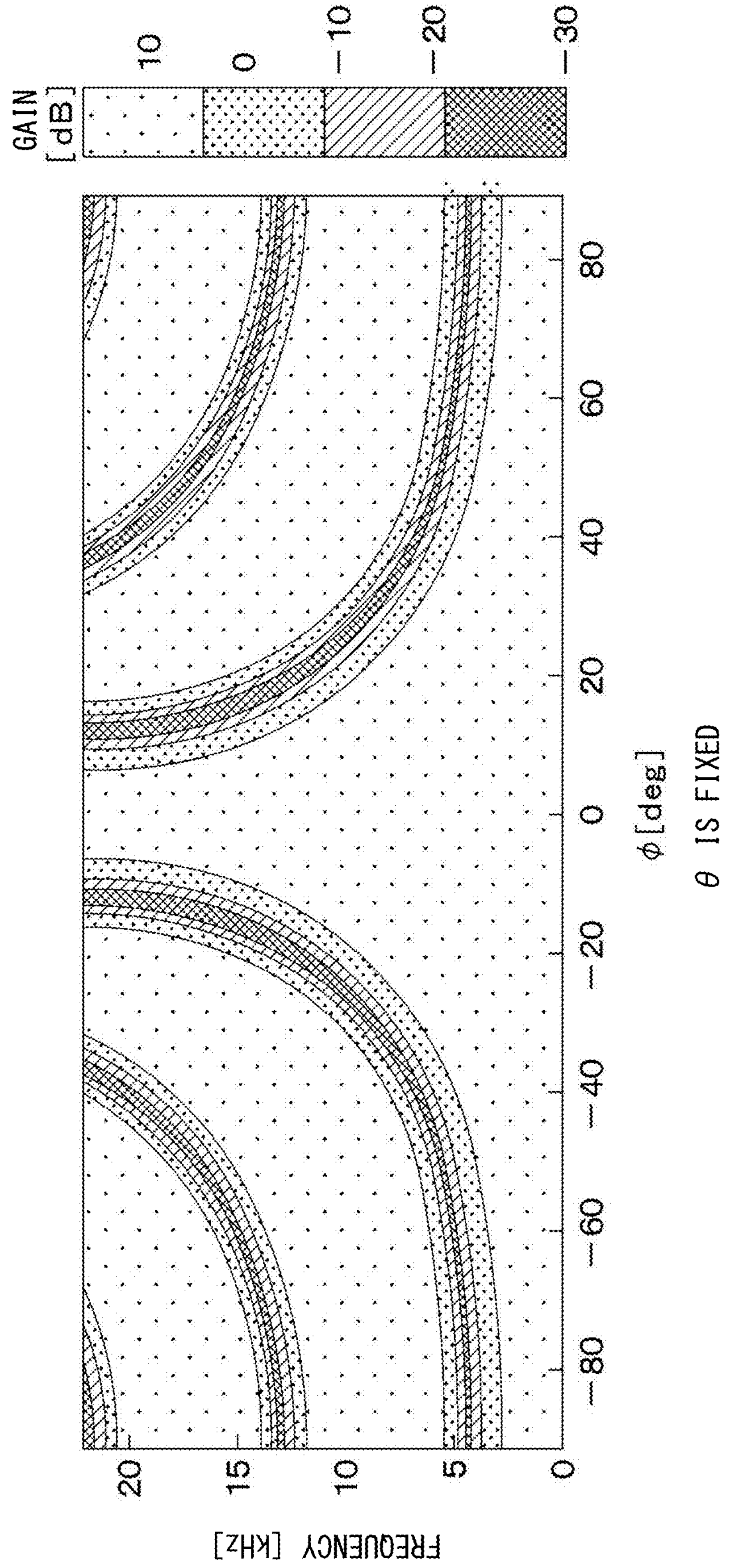
FIG. 16 is a distribution diagram showing the relationship between the second angle, the frequency of the sound wave, and the gain of the sound wave collected by the horn microphone when the first angle is fixed.

Here, for example, it is assumed that a1=a2=b1=b2=20 mm. In this case, as shown in FIGS. 14A to 14D, FIG. 15, and FIG. 16, although patterns of the directivity differ depending on the frequency of the sound wave, when the first angle θ and the second angle φ are 0°, the gains of the sound waves collected by the horn microphone 40 are relatively high. Therefore, in this case, when the first angle θ and the second angle φ are 0°, the directivity is generated in a direction in which sound waves reinforce each other at all frequencies. FIG. 14A shows a distribution indicating the relationship between the first angle θ, the second angle φ, and the gain of the sound waves collected by the horn microphone 40 when the frequency of the sound wave is 10 KHz. FIG. 14B shows a distribution indicating the relationship between the first angle θ, the second angle φ, and the gain of the sound waves collected by the horn microphone 40 when the frequency of the sound wave is 5 KHz. FIG. 14C shows a distribution indicating the relationship between the first angle θ, the second angle φ, and the gain of the sound waves collected by the horn microphone 40 when the frequency of the sound wave is 2 kHz. FIG. 14D shows a distribution indicating the relationship between the first angle θ, the second angle, and the gain of the sound waves collected by the horn microphone 40 when the frequency of the sound wave is 1 KHz. FIG. 15 shows the relationship between the second angle φ and the gain of the sound waves collected by the horn microphone 40 when the first angle θ is fixed and the frequency of the sound waves is set to 20 KHz, 10 KHz, 5 kHz, 2 KHz and 1 KHz. FIG. 16 shows a distribution indicating the relationship between the second angle φ, the frequency of the sound waves, and the gain of the sound waves collected by the horn microphone 40 when the first angle θ is fixed. In the present disclosure, the gain refers to the magnitude of the sound signal.

As described above, the directivity generator 210 generates the directivity. Next, the operation of the microphone device 10 adopted in a vehicle will be described.

The microphone device 10 is attached, for example, near a rear-view mirror inside a vehicle (not shown). Sound waves generated by a voice of a driver of the vehicle propagate through the directivity generator 210 and reach the horn microphone 40. The horn microphone 40 converts this sound into an analog signal. The analog wire 45 outputs the analog signal from the horn microphone 40 to a communication system (not shown) outside the microphone device 10. At this time, since digital signal processing and the like is not performed, the latency is relatively small. Therefore, for example, the microphone device 10 can be used as a microphone for hands-free communication between the microphone device 10 and the communication system.

Furthermore, sound waves generated by sounds inside the vehicle cabin propagate through the directivity generator 210 and reach the horn microphone 40. The horn microphone 40 converts this sound into an analog signal. The analog wire 45 outputs the analog signal from the horn microphone 40 to the communication system. At this time, since digital signal processing and the like is not performed, the latency is relatively small. Furthermore, since the analog signal does not pass through a relatively complicated circuit, the microphone device 10 is robust against disturbances such as shocks. Therefore, for example, the microphone device 10 can be used as a microphone for emergency communication between the microphone device 10 and the communication system to know the condition of the driver due to an abnormality in the vehicle or the driver of the vehicle.

The sound waves generated by the sounds inside the vehicle cabin propagate through the opening portions 200 and the substrate holes 304 and reach the microphone 35. The microphone 35 converts this sound into an analog signal. The ADC chip 50 converts the analog signal from the microphone 35 into a digital signal, and also converts the analog signal from the horn microphone 40 into a digital signal. Furthermore, the processor 60 performs the sound source separation such as BSS on these converted digital signals using ICA, PCA, or the like. As a result, the processor 60 makes noise contained in the digital signals converted by the ADC chip 50 smaller than noise contained in the analog signals from the horn microphone 40. The processor 60 outputs the signals after the digital signal processing to an analysis system (not shown) or the like outside the microphone device 10. The analysis system performs, for example, voice recognition on the signals after the digital signal processing. Therefore, the microphone device 10 can be used as a microphone for voice recognition for the analysis system.

The microphone device 10 operates as described above. Next, a description will be given of how the microphone device 10 performs the digital signal processing while restricting an increase in latency.

In an acoustic system, digital signal processing such as noise reduction may be performed on an electrical signal converted by a capsule. In such a case, for example, several tens of milliseconds of processing time is required due to AD conversion, buffering with the CPU, and DA conversion. Furthermore, when the electrical signal is converted to a frequency domain and processed by the CPU, a processing time of 160 milliseconds is required. This increases the latency, which is the delay time in communication.

The average latency in a telephone call is assumed to be 150 milliseconds. If the latency exceeds 200 milliseconds, the timing of speech may overlap. Thus, increased latency makes it difficult to make calls, resulting in reduced call quality. Thus, it is difficult to use the device for hands-free calling or emergency calling.

On the other hand, in a case where digital signal processing is not performed, the quality of the call deteriorates due to noise, making it difficult to communicate. Furthermore, the accuracy of the voice recognition is reduced, making it difficult to use for voice recognition.

With respect to these issues, the microphone device 10 of the present embodiment includes the housing 20, the microphones 35, the horn microphone 40, the analog wire 45, the ADC chip 50, and the processor 60.

The housing 20 has the opening portions 200 and the first horn 211. The first horn 211 includes the first horn opening portion 231 and the first horn tube 241. The microphones 35 are accommodated in the housing 20 and convert the sound propagating through the opening portions 200 into the analog signals. The horn microphone 40 is accommodated in the housing 20 and converts the sound propagated through the first horn 211 into the analog signal. The analog wire 45 is accommodated in the housing 20 and outputs the analog signal from the horn microphone 40.

The ADC chip 50 receives the analog signals from the microphones 35 and also receives the analog signal from the horn microphone 40 via the digital wire 55. The ADC chip 50 converts the analog signals from the microphones 35 and the horn microphone 40 into the digital signals. The digital wire 55 corresponds to a wire different from the analog wire 45.

The processor 60 performs the digital signal processing on the digital signals converted by the ADC chip 50. For example, the processor 60 performs the sound source separation on the digital signals converted by the ADC chip 50. As a result, the processor 60 makes noise contained in the digital signals converted by the ADC chip 50 smaller than noise contained in the analog signals from the horn microphone 40.

The signal output from the analog wire 45 is not digitally processed, and therefore the increase in latency is restricted. Furthermore, the processor 60 performs the digital signal processing. Therefore, the microphone device 10 performs the digital signal processing while restricting the increase in latency. Therefore, as described above, the microphone device 10 can be used as any of a microphone for hands-free communication, a microphone for emergency communication, and a microphone for voice recognition.

Furthermore, the microphone device 10 of the first embodiment also provides the effects described below.

The housing 20 has a plurality of horns, that is, the first horn 211, the second horn 212, the third horn 213 and the fourth horn 214.

This makes it easier for the horn microphone 40 to collect sound. Therefore, it becomes easier to ensure SNR of the analog signals from the horn microphone 40. Note that SNR is an abbreviation for Signal Noise Ratio.

The housing 20 has the first horn 211, the second horn 212, the third horn 213, the fourth horn 214, the first acoustic tube 221, the second acoustic tube 222, the third acoustic tube 223 and the fourth acoustic tube 224. The horn microphone 40 converts the sound propagating through the first horn 211, the first acoustic tube 221, the third acoustic tube 223, and the fourth acoustic tube 224 into the analog signal. The horn microphone 40 also converts the sound propagating through the second horn 212, the first acoustic tube 221, the third acoustic tube 223, and the fourth acoustic tube 224 into an analog signal. The horn microphone 40 also converts the sound propagating through the third horn 213, the second acoustic tube 222, the third acoustic tube 223 and the fourth acoustic tube 224 into an analog signal. Furthermore, the horn microphone 40 also converts the sound propagating through the fourth horn 214, the second acoustic tube 222, the third acoustic tube 223 and the fourth acoustic tube 224 into an analog signal.

The directivity is generated by the first horn 211, the second horn 212, the third horn 213, the fourth horn 214, the first acoustic tube 221, the second acoustic tube 222, the third acoustic tube 223 and the fourth acoustic tube 224. As described above, the directivity on the YZ plane is generated by a1 and a2. This makes it easy to control the directivity on the YZ plane. Furthermore, the directivity on the XZ plane is generated by b1 and b2. This makes it easy to control the directivity on the XZ plane.

It is assumed that the first horn 211, the second horn 212 and the first acoustic tube 221 are uniformly cylindrical and have the same cross-sectional area. In this case, when sound waves from outside the microphone device 10 reach the first horn 211 and the second horn 212, the acoustic impedance changes suddenly, and the sound waves are likely to be reflected at the first horn opening portion 231 and the second horn opening portion 232. Therefore, in this case, sound waves from outside the microphone device 10 are less likely to enter the first horn 211 and the second horn 212.

In this case, a part of the sound wave propagating from the first horn 211 through the first acoustic tube 221 is propagated to the second horn 212. The sound wave propagated to the second horn 212 is reflected at the second horn opening portion 232 because the acoustic impedance changes suddenly. A part of the sound wave reflected at the second horn opening portion 232 propagates through the second horn 212 and the first acoustic tube 221 to the first horn 211. The sound wave propagated to the first horn 211 is reflected at the first horn opening portion 231 because the acoustic impedance changes suddenly. A part of the sound wave reflected at the first horn opening portion 231 propagates through the first horn 211, the first acoustic tube 221 and the second horn 212, and is reflected at the second horn opening portion 232. Such sound waves traveling back and forth between the first horn 211 and the second horn 212 become reverberation. This reverberation makes voice recognition difficult.

Furthermore, it is assumed that the lengths of the first horn 211, the second horn 212 and the first acoustic tube 221 are lengths related to an integer multiple of a half wavelength of the sound wave. At this time, the sound waves traveling back and forth between the first horn 211 and the second horn 212 resonate. This resonance reduces the frequency characteristics of the microphone device 10, making voice recognition difficult.

It is also assumed that the third horn 213, the fourth horn 214 and the second acoustic tube 222 are uniformly cylindrical and have the same cross-sectional area. In this case, similarly to the above, sound waves from outside the microphone device 10 are less likely to enter the third horn 213 and the fourth horn 214. Furthermore, sound waves traveling back and forth between the third horn 213 and the fourth horn 214 become reverberation. This reverberation makes voice recognition difficult. It is also assumed that the lengths of the third horn 213, the fourth horn 214 and the second acoustic tube 222 are lengths related to an integer multiple of the half wavelength of the sound wave. At this time, similarly to the above, the sound waves traveling back and forth between the third horn 213 and the fourth horn 214 resonate. This resonance reduces the frequency characteristics of the microphone device 10, making voice recognition difficult.

With respect to these issues, the cross-sectional area of the first horn tube 241 when cut in the direction perpendicular to the one direction increases in the direction from the side of the first horn tube 241 opposite to the first horn opening portion 231 toward the first horn opening portion 231. In the present embodiment, the cross-sectional area of first horn tube 241 when cut in the direction perpendicular to the Z-axis increases in the positive direction of the Z-axis. Furthermore, in a manner similar to the cross-sectional area of first horn tube 241, the cross-sectional areas of the second horn tube 242, the third horn tube 243 and the fourth horn tube 244 increase in the positive direction if the Z-axis.

Accordingly, changes in the acoustic impedance at the first horn opening portion 231, the second horn opening portion 232, the third horn opening portion 233 and the fourth horn opening portion 234 can be restricted. Therefore, the sound waves from outside the microphone device 10 are less likely to be reflected at the first horn opening portion 231, the second horn opening portion 232, the third horn opening portion 233 and the fourth horn opening portion 234. Therefore, the sound waves from outside the microphone device 10 can easily enter the first horn 211, the second horn 212, the third horn 213 and the fourth horn 214.

In addition, the sound wave propagating from the first horn 211 through the first acoustic tube 221 to the second horn 212 is less likely to be reflected at the second horn opening portion 232. Furthermore, the sound wave propagating from the second horn 212 through the first acoustic tube 221 to the first horn 211 is less likely to be reflected at the first horn opening portion 231. Therefore, the sound waves that travel back and forth between the first horn 211 and the second horn 212 are less likely to be generated, and reverberation is less likely to occur. Similarly, the sound wave propagating from the third horn 213 through the second acoustic tube 222 to the fourth horn 214 is less likely to be reflected at the fourth horn opening portion 234. Furthermore, the sound wave propagating from the fourth horn 214 through the second acoustic tube 222 to the third horn 213 is less likely to be reflected at the third horn opening portion 233. Therefore, the sound waves traveling back and forth between the third horn 213 and the fourth horn 214 are less likely to be generated, and reverberation is less likely to occur. This makes voice recognition easier.

Furthermore, since the first horn 211 and the second horn 212 do not have a uniform cross-sectional area, the sound waves traveling back and forth between the first horn 211 and the second horn 212 are less likely to resonate. In addition, since the third horn 213 and the fourth horn 214 do not have a uniform cross-sectional area, the sound waves traveling back and forth between the third horn 213 and the fourth horn 214 are less likely to resonate. As a result, deterioration in the frequency characteristics of the microphone device 10 is restricted, making voice recognition easier.

Second Embodiment

Figure 17:
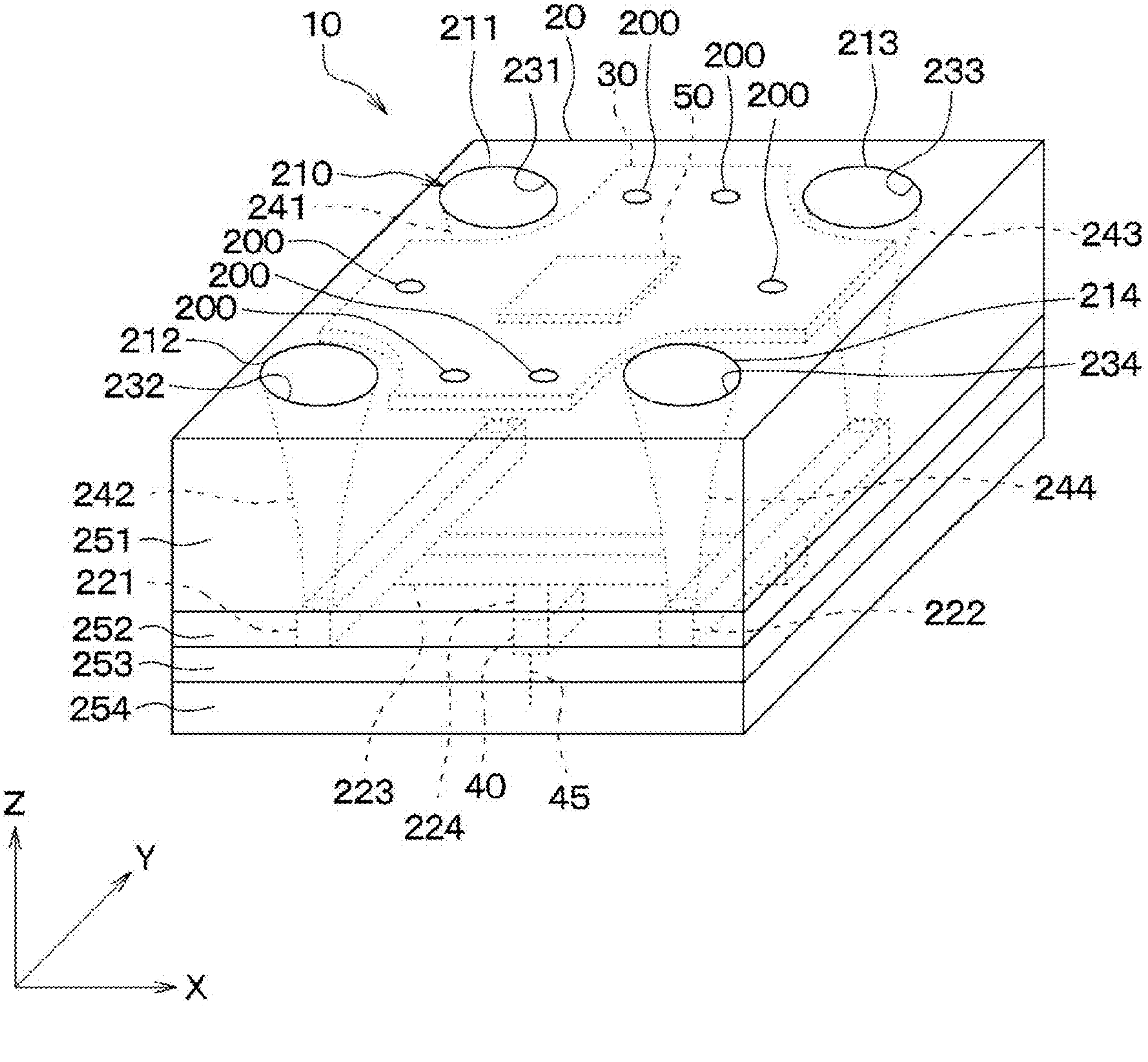
FIG. 17 is a perspective view of a microphone device according to a second embodiment.
Figure 18:
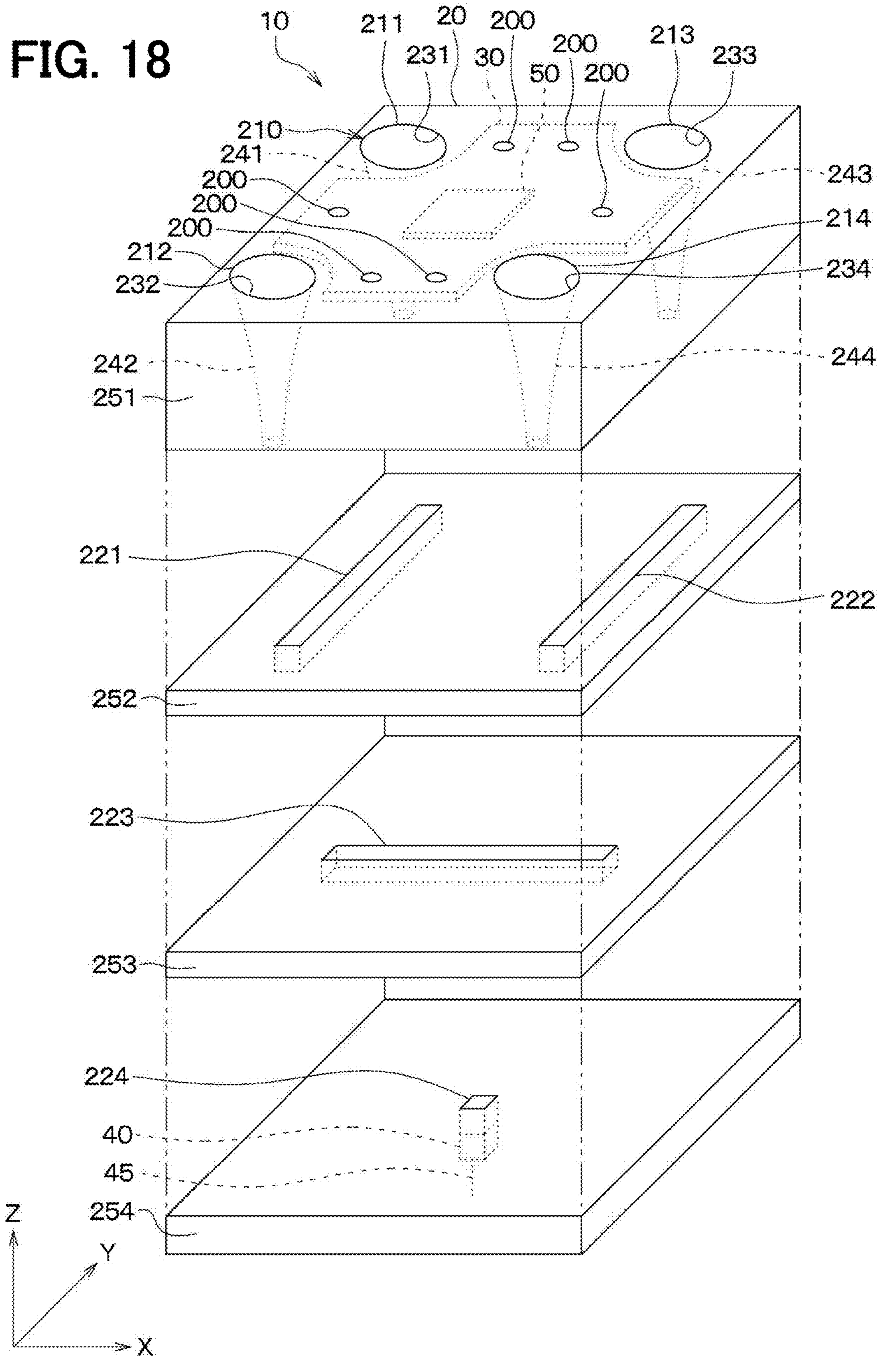
FIG. 18 is an exploded perspective view of the microphone device according to the second embodiment.
Figure 19:
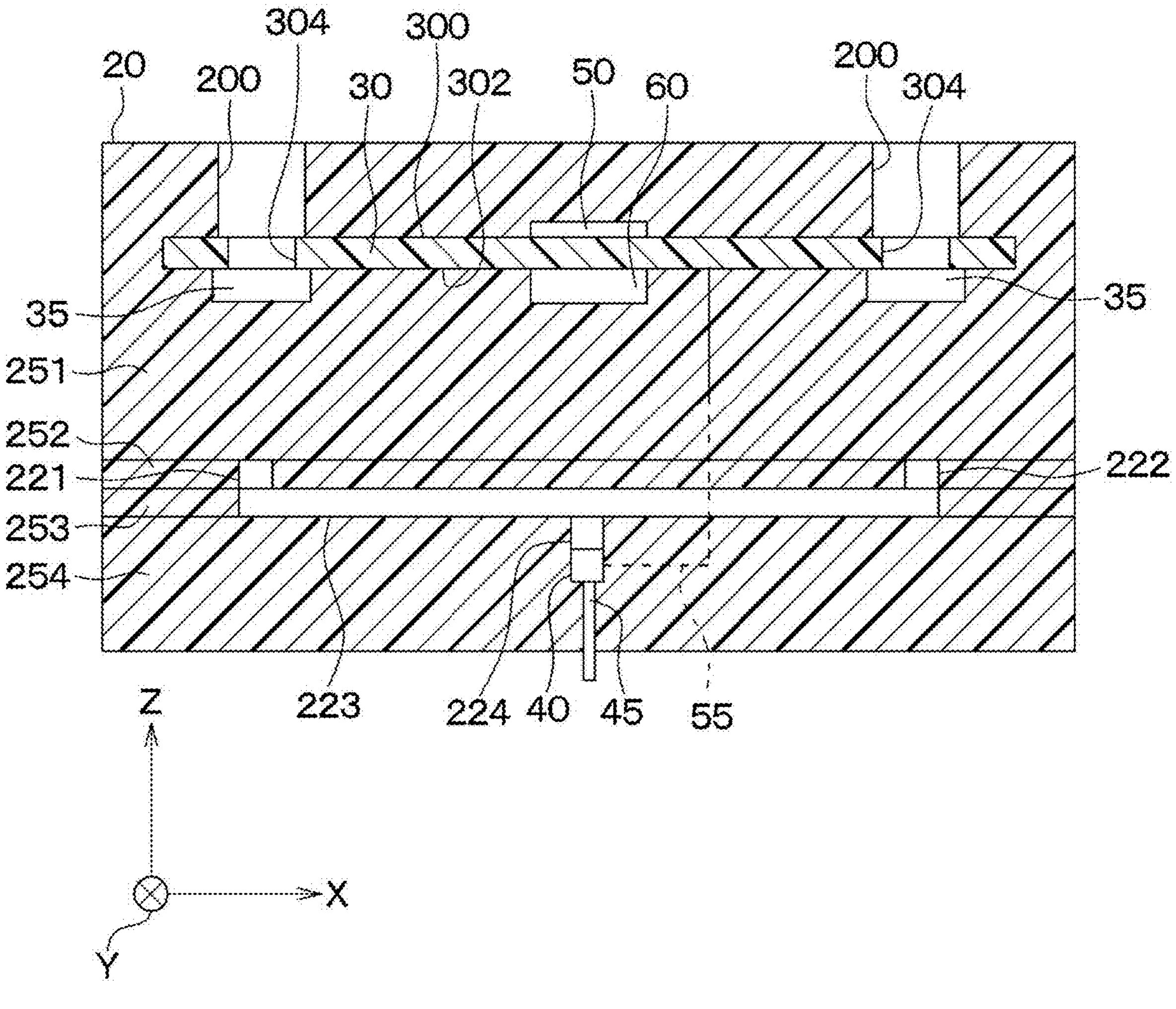
FIG. 19 is a cross-sectional view of the microphone device according to the second embodiment.

In s second embodiment, as shown in FIG. 17, FIG. 18 and FIG. 19, the shape of the housing 20 is different from that in the first embodiment. The other configurations are the same as those of the first embodiment.

The housing 20 further has a first layer 251, a second layer 252, a third layer 253 and a fourth layer 254. The second layer 252 is connected to the first layer 251 in the one direction, which corresponds to the Z-axis direction in the present embodiment. The third layer 253 is connected to a side of the second layer 252 opposite to the first layer 251. The fourth layer 254 is connected to a side of the third layer 253 opposite to the second layer 252.

The first layer 251 has the first horn 211, the second horn 212, the third horn 213 and the fourth horn 214. Furthermore, the first layer 251 covers the substrate 30, the microphones 35, the ADC chip 50 and the processor 60 as shown in FIG. 19.

Returning to FIG. 17 and FIG. 18, the second layer 252 has the first acoustic tube 221 and the second acoustic tube 222. The third layer 253 has the third acoustic tube 223. The fourth layer 254 has the fourth acoustic tube 224, and accommodates the horn microphone 40 and the analog wire 45.

The microphone device 10 of the second embodiment is configured as described above. The second embodiment achieves effects similar to the effects achieved by the first embodiment. Moreover, the second embodiment has the following effects.

The housing 20 further includes the first layer 251, the second layer 252, the third layer 253, and the fourth layer 254.

Accordingly, even if the housing 20 as a whole has a complex shape, the housing 20 can be divided into simple shapes and can be manufactured using injection molding or the like. This makes it easier to manufacture the housing 20, and therefore easier to manufacture the microphone device 10.

Third Embodiment

Figure 20:
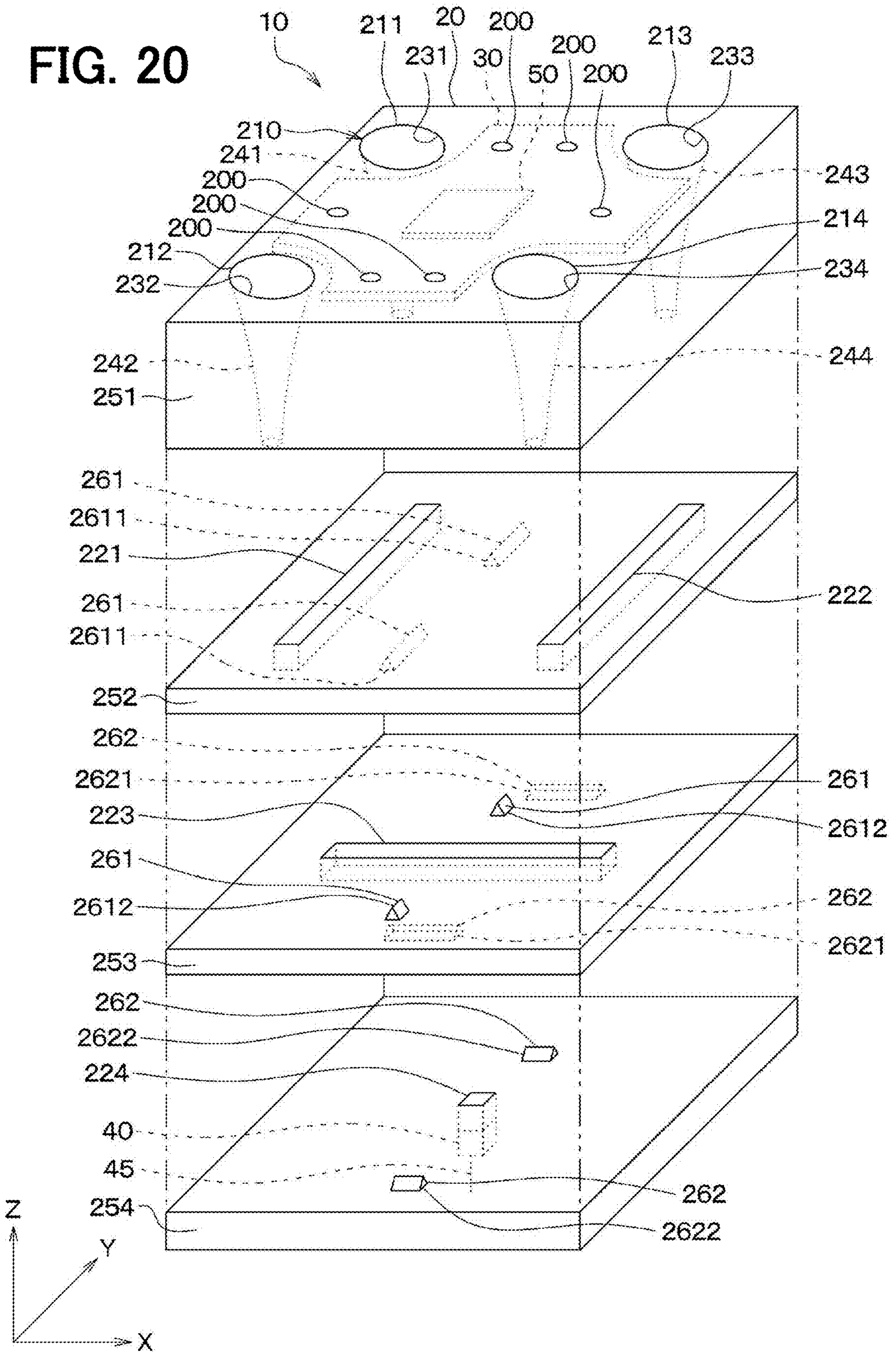
FIG. 20 is an exploded perspective view of a microphone device according to a third embodiment.

A third embodiment differs from the second embodiment in the shape of the housing 20 as shown in FIG. 20. Specifically, the housing 20 further has a first guide portion 261 and a second guide portion 262. The other configurations are the same as those of the second embodiment.

The first guide portion 261 enables the third layer 253 to move relative to the second layer 252 only in a direction that is perpendicular to the one direction and is the direction in which the first acoustic tube 221 extends, which corresponds to the Y-axis direction in the present embodiment. For example, the first guide portions 261 includes first recessed portions 2611 and first protruding portions 2612.

The first recessed portions 2611 are recessed from inner portions of a surface of the second layer 252 that faces the third layer 253, and extend in the Y-axis direction. In the present embodiment, the number of the first recessed portions 2611 is two. The first recessed portions 2611 are formed in the shapes of triangular prisms. This makes it difficult for stress concentration to occur, and the second layer 252 is less likely to be damaged. The first recessed portions 2611 are formed so as not to straddle the third acoustic tube 223. The number of the first recessed portions 2611 is not limited to two, but may be at least one. Furthermore, the shapes of the first recessed portions 2611 are not limited to the triangular prisms. The shapes of the first recessed portions 2611 may be polygonal columns, arc columns, or the like.

The first protruding portions 2612 protrude from inner portions of a surface of the third layer 253 that faces the second layer 252 toward the second layer 252. The first protruding portions 2612 are formed in the shapes corresponding to the first recessed portions 2611. The first protruding portions 2612 move within the first recessed portions 2611. Accordingly, the first guide portions 261 move the third layer 253 relative to the second layer 252 only in the Y-axis direction. In the present embodiment, the first recessed portions 2611 are formed in the second layer 252 and the first protruding portions 2612 are formed in the third layer 253. However, the present disclosure is not limited to this example. It is sufficient that the relative movement is possible only in the Y-axis direction, and the first protruding portions 2612 may be formed in the second layer 252, and the first recessed portions 2611 may be formed in the third layer 253.

The second guide portion 262 enables the third layer 253 to move relative to the fourth layer 254 only in a direction that is perpendicular to the one direction and is the direction in which the third acoustic tube 223 extends, which corresponds to the X-axis direction in the present embodiment. For example, the second guide portion 262 includes second recessed portions 2621 and a second protruding portions 2622.

The second recessed portions 2621 are recessed from inner portions of a surface of the third layer 253 that faces the fourth layer 254, and extends in the X-axis direction. In the present embodiment, the number of the second recessed portions 2621 is two. The second recessed portions 2621 are formed in the shapes of triangular prisms. This makes it difficult for stress concentration to occur, and the third layer 253 is less likely to be damaged. The second recessed portions 2621 are formed so as not to straddle the third acoustic tube 223. The number of the second recessed portions 2621 is not limited to two, but may be at least one. Furthermore, the shapes of the second recessed portions 2621 are not limited to the triangular prisms. The shapes of the second recessed portions 2621 may be polygonal columns, arc columns shape, or the like.

The second protruding portions 2622 protrude from inner portions of a surface of the fourth layer 254 that faces the third layer 253 toward the third layer 253. The second protruding portions 2622 are formed in the shapes corresponding to the second recessed portions 2621. Furthermore, the second protruding portions 2622 move within the second recessed portions 2621. Accordingly, the second guide portion 262 moves the third layer 253 relative to the fourth layer 254 only in the X-axis direction. In the present embodiment, the second recessed portions 2621 are formed in the third layer 253 and the second protruding portions 2622 are formed in the fourth layer 254. However, the present disclosure is not limited to this example. It is sufficient that the relative movement is possible only in the X-axis direction, and the second protruding portions 2622 may be formed in the third layer 253, and the second recessed portions 2621 may be formed in the fourth layer 254.

The microphone device 10 of the third embodiment is configured as described above. The third embodiment achieves effects similar to the effects achieved by the second embodiment. The third embodiment also achieves the following effects.

The housing 20 has the first guide portion 261. The first guide portion 261 enables the third layer 253 to move relative to the second layer 252 in the direction that is perpendicular to the one direction and is the direction in which the first acoustic tube 221 extends, which corresponds to the Y-axis direction in the present embodiment.

This makes it easier to adjust the positions of the first acoustic tube 221 and the second acoustic tube 222 formed in the second layer 252 and the third acoustic tube 223 formed in the third layer 253. Thus, it becomes easier to adjust a1 and a2. Therefore, it becomes easier to control the directivity on the YZ plane generated by a1 and a2.

The housing 20 has the second guide portion 262. The second guide portion 262 enables the third layer 253 to move relative to the fourth layer 254 in the direction that is perpendicular to the one direction and is the direction in which the third acoustic tube 223 extends, which corresponds the X-axis direction in the present embodiment.

This makes it easier to adjust the positions of the third acoustic tube 223 formed in the third layer 253 and the fourth acoustic tube 224 formed in the fourth layer 254. Thus, it becomes easier to adjust b1 and b2. Therefore, it becomes easier to control the directivity on the XZ plane generated by b1 and b2.

Fourth Embodiment

Figure 21:
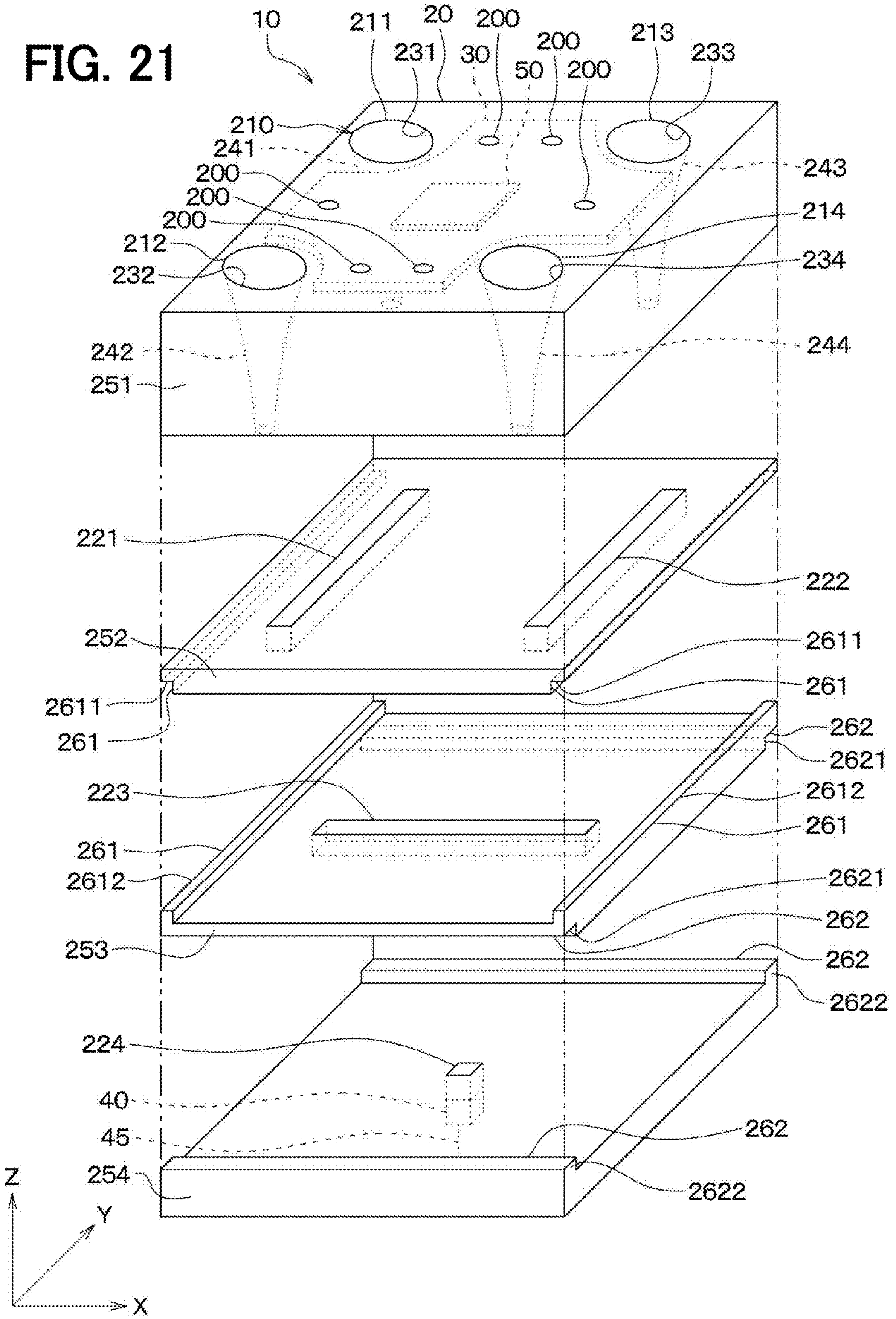
FIG. 21 is an exploded perspective view of a microphone device according to a fourth embodiment.

In a fourth embodiment, as shown in FIG. 21, the shapes of the first recessed portions 2611, the first protruding portions 2612, the second recessed portions 2621, and the second protruding portions 2622 are different from those in the third embodiment The other configurations are the same as those of the third embodiment.

The first recessed portions 2611 are recessed from both corners in a direction parallel to the X-axis of the surface of the second layer 252 that faces the third layer 253, instead of from the inner portions of the surface of the second layer 252 that faces the third layer 253. Accordingly, the second layer 252 has stepped shapes in the vicinity of the first recessed portions 2611. The first recessed portions 2611 extend in the Y-axis direction. The first recessed portions 2611 are not limited to being formed on both sides in the direction parallel to the X-axis, and may be formed on only one side in the direction parallel to the X-axis.

The first protruding portions 2612 protrude toward the second layer 252 from both corners in the X-axis direction of the surface of the third layer 253 that faces the second layer 252, instead of from the inner portions of the surface of the third layer 253 that faces the second layer 252. Therefore, the third layer 253 has stepped shapes in the vicinity of the first protruding portions 2612. The first protruding portions 2612 are formed in the shapes corresponding to the first recessed portions 2611, and move within the first recessed portions 2611. Accordingly, the first guide portion 261 moves the third layer 253 relative to the second layer 252 in the Y-axis direction.

The second recessed portions 2621 is recessed from both corners in a direction parallel to the Y-axis of the surface of the third layer 253 that faces the fourth layer 254, instead of from the inner portions of the surface of the third layer 253 that faces the fourth layer 254. Accordingly, the third layer 253 has stepped shapes in the vicinity of the second recessed portions 2621. The second recessed portions 2621 extend in the X-axis direction. The second recessed portions 2621 are not limited to being formed on both sides in the direction parallel to the Y-axis, and may be formed on only one side in the direction parallel to the Y-axis.

The second protruding portions 2622 protrude toward the third layer 253 from the corners in the Y-axis direction of the surface of the fourth layer 254 that faces the third layer 253, instead of from the inner portions of the surface of the fourth layer 254 that faces the third layer 253. Therefore, the fourth layer 254 has stepped shapes in the vicinity of the second protruding portions 2622. The second protruding portions 2622 are formed in the shapes corresponding to the second recessed portions 2621, and move within the second recessed portions 2621. Accordingly, the second guide portion 262 move the third layer 253 relative to the fourth layer 254 in the X-axis direction.

The microphone device 10 of the fourth embodiment is configured as described above. The fourth embodiment achieves effects similar to the effects achieved by the third embodiment.

Fifth Embodiment

Figure 22:
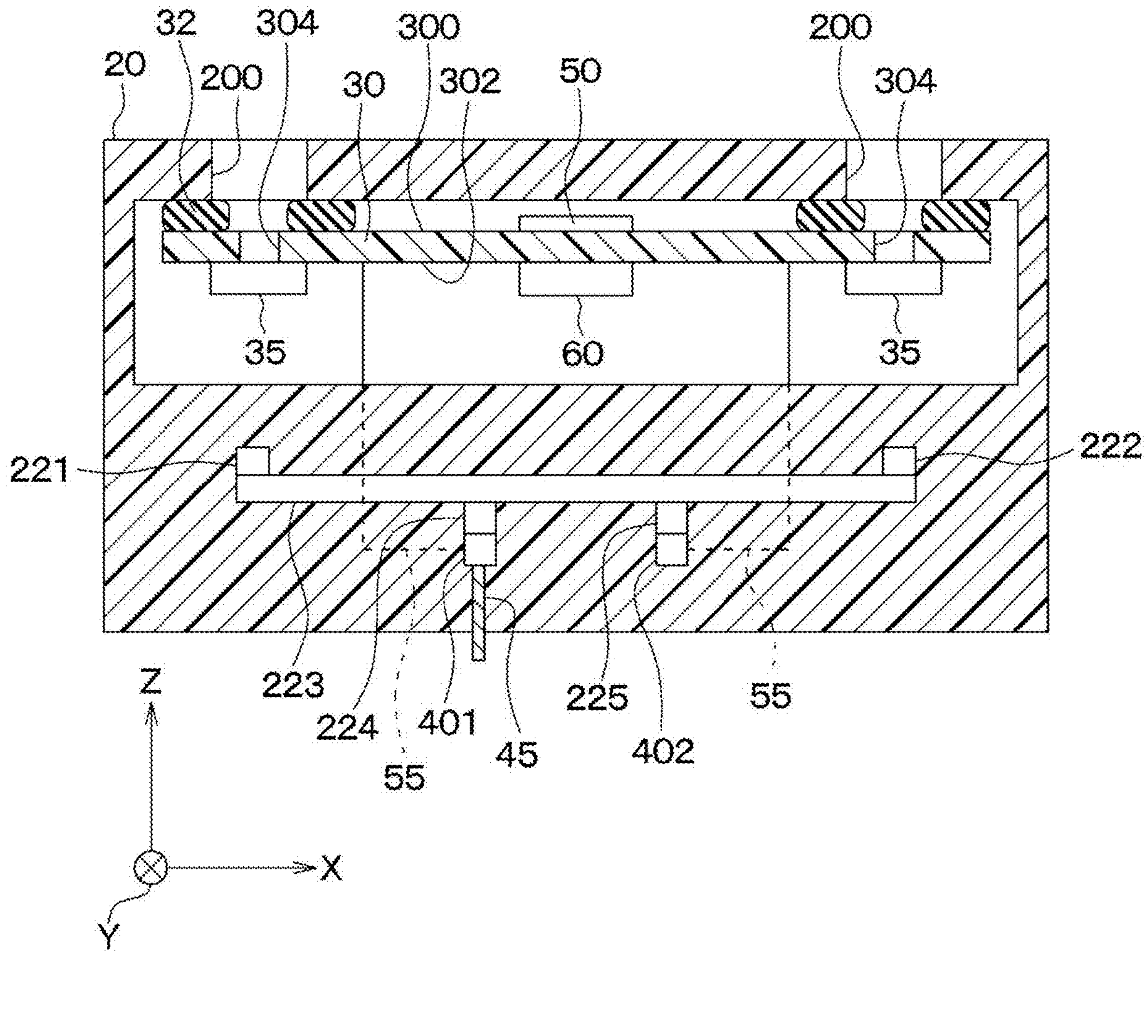
FIG. 22 is a cross-sectional view of a microphone device according to a fifth embodiment.
Figure 23:
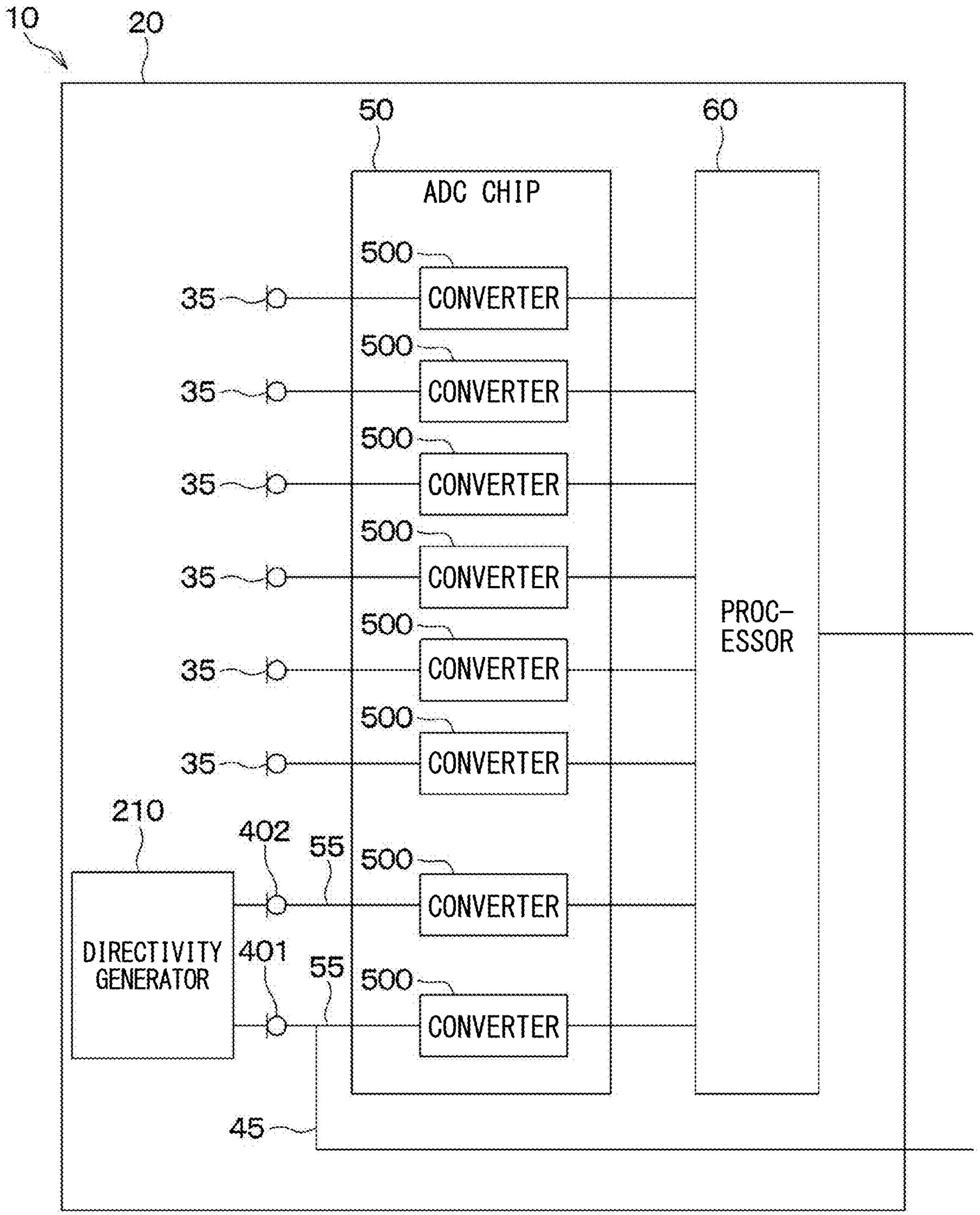
FIG. 23 is a configuration diagram of the microphone device according to the fifth embodiment.

In a fifth embodiment, as shown in FIG. 22 and FIG. 23, the form of the directivity generator 210 differs from that in the first embodiment. In addition, the microphone device 10 includes two horn microphones 40. The other configurations are similar to those of the first embodiment.

The directivity generator 210 further has a fifth acoustic tube 225 in addition to the first horn 211, the second horn 212, the third horn 213, the fourth horn 214, the first acoustic tube 221, the second acoustic tube 222, the third acoustic tube 223 and the fourth acoustic tube 224.

The fifth acoustic tube 225 is formed in a cylindrical shape, and is connected to a portion of the third acoustic tube 223 between the first acoustic tube 221 and the second acoustic tube 222 in the Z-axis direction. The fifth acoustic tube 225 extends from the third acoustic tube 223 in a direction that intersects the direction in which the third acoustic tube 223 extends, which is the negative direction of the Z-axis in the present embodiment. The fifth acoustic tube 225 is not limited to extending from the third acoustic tube 223 in the Z-axis direction, and may extend from the third acoustic tube 223 in the Y-axis direction, or the like.

The portion of the third acoustic tube 223 to which the fourth acoustic tube 224 is connected is closer to the first acoustic tube 221 than the portion of the third acoustic tube 223 to which the fifth acoustic tube 225 is connected. The portion of the third acoustic tube 223 to which the fifth acoustic tube 225 is connected is closer to the second acoustic tube 222 than the portion of the third acoustic tube 223 to which the fourth acoustic tube 224 is connected. Therefore, the fourth acoustic tube 224 and the fifth acoustic tube 225 are aligned in the direction in which the third acoustic tube 223 extends, which is the X-axis direction in the present embodiment.

In addition, the microphone device 10 includes two horn microphones 40. One of the horn microphones 40 is referred to as a first horn microphone 401. The other of the horn microphones 40 is referred to as a second horn microphone 402.

The first horn microphone 401 is connected to the fourth acoustic tube 224. The first horn microphone 401 converts the sound propagating through the first horn 211, the first acoustic tube 221, the third acoustic tube 223, and the fourth acoustic tube 224 into an analog signal. The first horn microphone 401 also converts the sound propagating through the second horn 212, the first acoustic tube 221, the third acoustic tube 223, and the fourth acoustic tube 224 into an analog signal. The first horn microphone 401 also converts the sound propagating through the third horn 213, the second acoustic tube 222, the third acoustic tube 223, and the fourth acoustic tube 224 into an analog signal. Furthermore, the first horn microphone 401 also converts the sound propagating through the fourth horn 214, the second acoustic tube 222, the third acoustic tube 223 and the fourth acoustic tube 224 into an analog signal. The first horn microphone 401 outputs the converted analog signals to the outside of the microphone device 10 via the analog wire 45. Furthermore, the first horn microphone 401 outputs the converted analog signals to the ADC chip 50 via the digital wire 55 and the substrate 30.

The second horn microphone 402 is connected to the fifth acoustic tube 225. The second horn microphone 402 converts the sound propagating through the first horn 211, the first acoustic tube 221, the third acoustic tube 223, and the fifth acoustic tube 225 into an analog signal. The second horn microphone 402 also converts the sound propagating through the second horn 212, the first acoustic tube 221, the third acoustic tube 223, and the fifth acoustic tube 225 into an analog signal. The second horn microphone 402 also converts the sound propagating through the third horn 213, the second acoustic tube 222, the third acoustic tube 223, and the fifth acoustic tube 225 into an analog signal. Furthermore, the second horn microphone 402 also converts the sound propagating through the fourth horn 214, the second acoustic tube 222, the third acoustic tube 223, and the fifth acoustic tube 225 into an analog signal. The second horn microphone 402 outputs the converted analog signals to the ADC chip 50 via the digital wire 55 and the substrate 30. In the present embodiment, the second horn microphone 402 does not output the converted analog signals to the outside of the microphone device 10 via the analog wire 45. However, the second horn microphone 402 may output the converted analog signals to the outside of the microphone device 10 via wire or the like.

The microphone device 10 of the fifth embodiment is configured as described above. The fifth embodiment achieves effects similar to the effects achieved by the first embodiment. The fifth embodiment also achieves the following effects.

The housing 20 further has the fifth acoustic tube 225. In addition, the microphone device 10 includes the first horn microphone 401 and the second horn microphone 402.

As a result, just as the directivity on the XZ plane is determined by b1 and b2 in the first embodiment, two directivities on the XZ plane can be determined independently depending on where the fourth acoustic tube 224 and the fifth acoustic tube 225 are placed in the third acoustic tube 223. Therefore, for example, when the microphone device 10 is adopted in a vehicle, the first horn microphone 401 can pick up the voice of the vehicle driver, and the second horn microphone 402 can pick up the voice of passengers other than the vehicle driver.

OTHER EMBODIMENTS

The present disclosure is not limited to the above-described embodiments, and the above-described embodiments can be appropriately modified. The constituent element(s) of each of the above-described embodiments is/are not necessarily essential unless it is specifically stated that the constituent element(s) is/are essential in the above-described embodiments, or unless the constituent element(s) is/are obviously essential in principle.

The conversion unit, the processor, and the methods thereof described in the present disclosure may be realized by a dedicated computer provided by configuring a processor, programmed to execute one or more functions embodied by a computer program, and a memory. Alternatively, the conversion unit, the processor, and the methods thereof described in the present disclosure may be realized by a dedicated computer provided by configuring a processor with one or more dedicated hardware logic circuits. Alternatively, the conversion unit, the processor, and the methods thereof described in the present disclosure may be realized by one or more dedicated computers configured by a combination of a processor programmed to execute one or more functions, a memory, and a processor configured by one or more hardware logic circuits. The computer programs may be stored, as instructions to be executed by a computer, in a tangible non-transitory computer-readable medium.

In each of the above-described embodiments, the number of opening portions 200, the microphones 35 and the converters 500 is six. However, the numbers of the opening portions 200, the microphones 35 and the converters 500 are not limited to six, but may be at least one.

In each of the above-described embodiments, four horns are formed. However, the number of horns is not limited to four, but may be at least one. In addition, in each of the above-described embodiments, the horn microphone 40 is connected to each horn via the first acoustic tube 221, the second acoustic tube 222, the third acoustic tube 223 and the fourth acoustic tube 224. However, the horn microphone 40 may be directly connected to each horn without via the first acoustic tube 221, the second acoustic tube 222, the third acoustic tube 223 and the fourth acoustic tube 224.

In each of the above-described embodiments, the substrate 30, the ADC chip 50 and the processor 60 are accommodated in the housing 20. However, the substrate 30, the ADC chip 50 and the processor 60 are not limited to being accommodated in the housing 20. The substrate 30, the ADC chip 50 and the processor 60 may be disposed outside the housing 20.

In each of the above-described embodiments, the ADC chip 50 is mounted on the substrate front surface 300. However, the ADC chip 50 is not limited to being mounted on the substrate front surface 300, and may be mounted on the substrate rear surface 302. The ADC chip 50 may also be mounted on a printed circuit board that is separated from the substrate 30 and disposed within the housing 20.

In each of the above-described embodiments, the processor 60 is mounted on the substrate rear surface 302. However, the processor 60 is not limited to being mounted on the substrate rear surface 302, and may be mounted on the substrate front surface 300. The processor 60 may also be mounted on a printed circuit board that is separated from the substrate 30 and disposed within the housing 20.

In the first to fifth embodiments, the number of the fourth acoustic tubes 224 is one. In the fifth embodiment, the number of the fifth acoustic tubes 225 is one. However, the number of each of the fourth acoustic tube 224 and the fifth acoustic tube 225 is not limited to one, and may be two or more.

What is claimed is:

1. A microphone device comprising:

a housing having
- an opening portion being opened, and
- a horn including a horn opening portion and a horn tube, the horn opening portion being opened at a position different from the opening portion, the horn tube being connected to the horn opening portion and extending in one direction;

a microphone accommodated in the housing and configured to convert a sound that has propagated through the opening portion into an analog signal;

a horn microphone accommodated in the housing and configured to convert a sound that has propagated through the horn into an analog signal;

an analog wire accommodated in the housing and configured to output the analog signal from the horn microphone;

a conversion unit configured to
- acquire the analog signal from the microphone,
- acquire the analog signal from the horn microphone via a wire different from the analog wire, and
- convert the analog signal from the microphone and the analog signal from the horn microphone into digital signals; and a processor configured to perform digital signal processing on the digital signals converted by the conversion unit.

2. The microphone device according to claim 1, wherein the housing has a plurality of horns each of which is the horn.

3. The microphone device according to claim 1, wherein the horn opening portion is a first horn opening portion,
the horn tube is a first horn tube,
the horn is a first horn,
the housing further has a second horn, a third horn, a fourth horn, a first acoustic tube, a second acoustic tube, a third acoustic tube, and a fourth acoustic tube,
the second horn includes a second horn opening portion and a second horn tube,
the second horn opening portion is located at a position different from the opening portion and the first horn opening portion, and is opened in a direction in which the first horn opening portion is opened,
the second horn tube is connected to the second horn opening portion and extends in the one direction,
the third horn includes a third horn opening portion and a third horn tube,
the third horn opening portion is located at a position different from the opening portion, the first horn opening portion, and the second horn opening portion, and is opened in the direction in which the first horn opening portion is opened,
the third horn tube is connected to the third horn opening portion and extends in the one direction,
the fourth horn includes a fourth horn opening portion and a fourth horn tube,
the fourth horn opening portion is located at a position different from the opening portion, the first horn opening portion, the second horn opening portion, and the third horn opening portion, and is opened in the direction in which the first horn opening portion is opened,
the fourth horn tube is connected to the fourth horn opening portion and extends in the one direction,
the first horn and the second horn are aligned in a direction that is perpendicular to the one direction,
the first horn and the third horn are aligned in a direction that is perpendicular to the one direction and the direction in which the first horn and the second horn are aligned,
the second horn and the fourth horn are aligned in the direction perpendicular to the one direction and the direction in which the first horn and the second horn are aligned,
the third horn and the fourth horn are aligned in the direction in which the first horn and the second horn are aligned,
the first acoustic tube is connected to the first horn tube and the second horn tube and extends in a direction that intersects the one direction,
the second acoustic tube is connected to the third horn tube and the fourth horn tube, and extends in the direction in which the first acoustic tube extends,
the third acoustic tube is connected to the first acoustic tube and the second acoustic tube, and extends in a direction that intersects the one direction and the direction in which the first acoustic tube extends,
the fourth acoustic tube is connected to a portion of the third acoustic tube between the first acoustic tube and the second acoustic tube, and extends in a direction that intersects the direction in which the third acoustic tube extends, and
the horn microphone is configured to convert a sound that has propagated through the first horn, the first acoustic tube, the third acoustic tube, and the fourth acoustic tube, a sound that has propagated through the second horn, the first acoustic tube, the third acoustic tube, and the fourth acoustic tube, a sound that has propagated through the third horn, the second acoustic tube, the third acoustic tube, and the fourth acoustic tube, and a sound that has propagated through the fourth horn, the second acoustic tube, the third acoustic tube, and the fourth acoustic tube into analog signals.

4. The microphone device according to claim 3, wherein the housing further has a first layer, a second layer connected to the first layer in the one direction, a third layer connected to a side of the second layer opposite to the first layer, and a fourth layer connected to a side of the third layer opposite to the second layer,
the first layer has the first horn, the second horn, the third horn, and the fourth horn,
the second layer has the first acoustic tube and the second acoustic tube,
the third layer has the third acoustic tube, and
the fourth layer has the fourth acoustic tube.

5. The microphone device according to claim 4, wherein the fourth layer accommodates the horn microphone.

6. The microphone device according to claim 4, wherein the housing further has a guide portion that enables the third layer to move relative to the second layer in a direction that is perpendicular to the one direction and is a direction in which the first acoustic tube extends.

7. The microphone device according to claim 4, wherein the housing further has a guide portion that enables the third layer to move relative to the fourth layer in a direction that is perpendicular to the one direction and is a direction in which the third acoustic tube extends.

8. The microphone device according to claim 3, wherein the housing further has a fifth acoustic tube that is connected to a portion of the third acoustic tube between the first acoustic tube and the second acoustic tube and extends in a direction that intersects the direction in which the third acoustic tube extends,
the portion of the third acoustic tube to which the fourth acoustic tube is connected is closer to the first acoustic tube than the portion of the third acoustic tube to which the fifth acoustic tube is connected,
the portion of the third acoustic tube to which the fifth acoustic tube is connected is closer to the second acoustic tube than the portion of the third acoustic tube to which the fourth acoustic tube is connected,
the fourth acoustic tube and the fifth acoustic tube are aligned in the direction in which the third acoustic tube extends,
the horn microphone is a first horn microphone,
the microphone device further comprises a second horn microphone,
the first horn microphone and the second horn microphone are arranged in the direction in which the third acoustic tube extends,
the first horn microphone is configured to convert the sound that has propagated through the first horn, the first acoustic tube, the third acoustic tube, and the fourth acoustic tube, the sound that has propagated through the second horn, the first acoustic tube, the third acoustic tube, and the fourth acoustic tube, the sound that has propagated through the third horn, the second acoustic tube, the third acoustic tube, and the fourth acoustic tube, and the sound that has propagated through the fourth horn, the second acoustic tube, the third acoustic tube, and the fourth acoustic tube into analog signals, and the second horn microphone is configured to convert the sound that has propagated through the first horn, the first acoustic tube, the third acoustic tube, and the fifth acoustic tube, the sound that has propagated through the second horn, the first acoustic tube, the third acoustic tube, and the fifth acoustic tube, the sound that has propagated through the third horn, the second acoustic tube, the third acoustic tube, and the fifth acoustic tube, and the sound that has propagated through the fourth horn, the second acoustic tube, the third acoustic tube, and the fifth acoustic tube into analog signals.

9. The microphone device according to claim 1, wherein a cross-sectional area of the horn tube when cut in a direction perpendicular to the one direction increases from a side of the horn tube opposite to the horn opening portion toward the horn opening portion.

10. The microphone device according to claim 1, wherein the processor is configured to perform sound source separation on the digital signals converted by the conversion unit to make noise contained in the digital signals converted by the conversion unit smaller than noise contained in the analog signal from the horn microphone.

* * * * *